US010826180B2

(12) United States Patent
Hong et al.

(10) Patent No.: US 10,826,180 B2
(45) Date of Patent: Nov. 3, 2020

(54) LOW-PROFILE MULTI-BAND STACKED PATCH ANTENNA

(71) Applicant: The Board of Trustees of The University of Alabama, Tuscaloosa, AL (US)

(72) Inventors: Yang-Ki Hong, Tuscaloosa, AL (US); Woncheol Lee, Tuscaloosa, AL (US)

(73) Assignee: The Board of Trustees of the University of Alabama, Tuscaloosa, AL (US)

(*) Notice: Subject to any disclaimer, the term of this patent is extended or adjusted under 35 U.S.C. 154(b) by 64 days.

(21) Appl. No.: 16/204,357

(22) Filed: Nov. 29, 2018

(65) Prior Publication Data

US 2019/0165476 A1 May 30, 2019

Related U.S. Application Data

(60) Provisional application No. 62/592,029, filed on Nov. 29, 2017.

(51) Int. Cl.
*H01Q 1/38* (2006.01)
*H01Q 9/04* (2006.01)
(Continued)

(52) U.S. Cl.
CPC ........... *H01Q 9/0414* (2013.01); *H01Q 5/392* (2015.01); *H01Q 19/005* (2013.01); *H01Q 21/065* (2013.01); *H01Q 21/28* (2013.01)

(58) Field of Classification Search
CPC .... H01Q 9/0414; H01Q 21/28; H01Q 21/065; H01Q 19/005; H01Q 5/392
See application file for complete search history.

(56) References Cited

U.S. PATENT DOCUMENTS 5,422,649 A * 6/1995 Huang ............... H01Q 21/0075 343/700 MS
6,091,365 A * 7/2000 Derneryd ............... H01Q 1/246 343/700 MS
(Continued)

FOREIGN PATENT DOCUMENTS

KR 10-2005-0064493 6/2005

OTHER PUBLICATIONS

M. Weigle, "Standards: WAVE/DSRC/802.11p," Old Dominion University, 2008: available at http://www.cs.odu.edu/~mweigle/courses/cs795-s08/lectures/5c-DSRC.pdf 19 pages.
(Continued)

*Primary Examiner* — Dieu Hien T Duong
(74) *Attorney, Agent, or Firm* — Meunier Carlin & Curman LLC

(57) ABSTRACT

The exemplified systems and methods provides a low-profile stacked patch multi-frequency antenna (e.g., a dual-frequency antenna). A design is disclosed which is configured to operate at the 5.9-GHz band (e.g., for Dedicated Short Range Communications) and the 28-GHz band (e.g., for 5G communications). With a low-profile, the exemplified systems and methods can be integrated into existing microelectronic packaging systems as well as readily integrated into communication systems having smaller form factor.

18 Claims, 24 Drawing Sheets
(2 of 24 Drawing Sheet(s) Filed in Color)

(51) Int. Cl.

| | |
|---|---|
| ***H01Q 21/06*** | (2006.01) |
| ***H01Q 19/00*** | (2006.01) |
| ***H01Q 5/392*** | (2015.01) |
| ***H01Q 21/28*** | (2006.01) |

(56) References Cited

U.S. PATENT DOCUMENTS

| | | | | |
|---|---|---|---|---|
| 6,118,406 | A | 9/2000 | Josypenko | |
| 7,629,930 | B2 * | 12/2009 | Murch | H01Q 1/48 343/700 MS |
| 2004/0104852 | A1 | 6/2004 | Choi et al. | |
| 2005/0116862 | A1 | 6/2005 | Du Toit | |
| 2009/0009399 | A1 * | 1/2009 | Gaucher | H01Q 21/0006 343/700 MS |
| 2011/0001682 | A1 | 1/2011 | Rao | |
| 2018/0241135 | A1 * | 8/2018 | Furlan | H01Q 21/065 |
| 2018/0332151 | A1 * | 11/2018 | Kamgaing | G06F 1/1613 |

OTHER PUBLICATIONS

P. Li, K. M. Luk, and K. L. Lau, "A dual-feed dual-band L-probe patch antenna," IEEE Transactions on Antennas and Propagation, vol. 53, No. 7, pp. 2321-2323 (2005).

Y.-X. Sun, et al., "Substrate-Integrated Two-Port Dual-Frequency Antenna," IEEE Trans. Antennas Propag., vol. 64, p. 3692-3697 (2016).

L. Y. Feng and K. W. Leung, "Dual-frequency folded-parallel-plate antenna with large frequency ratio," IEEE Transactions on Antennas and Propagation, vol. 64, No. 1, pp. 340-345 (2016).

International Search Report and Written Opinion issued for International Application No. PCT/US2018/063033, dated Mar. 21, 2019, 13 pages.

* cited by examiner

| | | | | | | | | | |
|---|---|---|---|---|---|---|---|---|---|
| $SL_1$ | $SW_1$ | $SH_1$ | $SL_2$ | $SW_2$ | $SH_2$ | $PL_1$ | $PW_1$ | $PL_2$ | $PW_2$ |
| 28.87 | 27.32 | 0.787 | 14.15 | 15.6 | 0.787 | 16.15 | 22.6 | 3.15 | 4.23 |
| $L_{INSET}$ | $W_{INSET}$ | $TL_1$ | $TW_1$ | $TL_2$ | $TW_2$ | $TL_3$ | $TW_3$ | $FL_1$ | $FW_1$ |
| 0.35 | 0.2 | 3.35 | 0.67 | 2.29 | 0.91 | 7.935 | 0.228 | 1.36 | 2.4 |
| $FL_2$ | $FW_2$ | SLOTL | SLOTW | CL | CW | $g_1$ | $g_2$ | UNIT IN mm | |
| 9 | 0.95 | 1.2 | 1.2 | 0.95 | 0.4 | 2.2 | 6.06 | | |

1402a

1402b

Electric Field Distributions

At DSRC (5.9 GHz)

COMPARISON ON ANTENNA PERFORMANCE AMONG DUAL- FREQUENCY ANTENNAS

| | FREQUENCY RATIO ($f_H/f_L$) | ISOLATION | PEAK GAIN ($f_L/f_H$) | VOLUME |
|---|---|---|---|---|
| [1] | 3.3 (3 / 0.9 GHz) | NOT GIVEN | 8.5 / 8 dBi | $2.43\ \lambda_H \times 2.43\ \lambda_H \times 0.47\ \lambda_H$ |
| [2] | 10 (24 / 2.4 GHz) | > 25 dB | 7.4 / 12.2 dBi | $8\ \lambda_H \times 8\ \lambda_H \times 1.73\ \lambda_H$ |
| [3] | 4.6 (24 / 5.2 GHz) | > 35 dB | 5.8 / 7.1 dBi | $3.2\ \lambda_H \times 2\ \lambda_H \times 0.12\ \lambda_H$ |
| STACKED ANTENNA | 4.7 (28 / 5.9 GHz) | > 35 dB | 7.3 / 13.6 dBi | $2.7\ \lambda_H \times 2.6\ \lambda_H \times 0.15\ \lambda_H$ |

FIG. 24

LOW-PROFILE MULTI-BAND STACKED PATCH ANTENNA

RELATED APPLICATION

This application claims priority to, and the benefit of, U.S. Provisional Application No. 62/592,029, filed Nov. 29, 2017, titled "Low-Profile Multi-Band Stacked Patch Antenna," which is incorporated by reference herein in its entirety.

BACKGROUND

Dual-frequency band antennas for Dedicated Short Range Communications (DSRC) and for 5G network may be suitable for use with telematics systems. The U.S. Department of Transportation is considering plans to require that land-based vehicles are equipped with dedicated short-range communication such as DSRC devices to accommodate vehicle-to-vehicle (V2V) and vehicle-to-infrastructure (V2I) communications. DSRC is an open-source protocol for wireless communication and is intended for highly secure, high-speed wireless communication among vehicles and infrastructure in vehicle-to-vehicle (V2V) and vehicle-to-infrastructure (V2I) communication systems. Such V2V and V2I systems can be used, for example, in safety devices such as in blind-spot warning systems, forward-collision warning systems, and rollover warning systems, among others. Such V2V and V2I systems can also be used for transacting electronic parking payments and toll payments as well as to provide on-board vehicle information such as for traffic and travel information. Although DSRC has many advantages for safety features in a vehicle, 5G communication networks has many advantages for mobile entertainment system and autonomous driving system. Indeed, the use of DSRC communication simultaneously with 5G network communications will have commercial applicability, particular, for future driving systems.

Although dual-frequency antennas have been widely studied, no antenna design currently covers DSRC and 5 G networks simultaneously. Further, existing dual frequency antennas are bulky and have a high profile that introduces physical challenges in the integration of such antennas in existing micro-packaging and/or electronic systems.

For example, as reported in P. Li, K. M. Luk, and K. L. Lau, "A dual-feed dual-band L-probe patch antenna," IEEE Transactions on Antennas and Propagation, vol. 53, no. 7, pp. 2321-2323 (2005), a dual-feed dual-band L-probe patch antenna is disclosed that covers the 0.9-Ghz and 3-GHz bands. These antennas are reported to have a high profile of 0.47 $\lambda_H$ (47 mm), where $\lambda_H$ is the air wavelength of the high frequency band.

In L. Y. Feng and K. W. Leung, "Dual-frequency folded-parallel-plate antenna with large frequency ratio," IEEE Transactions on Antennas and Propagation, vol. 64, no. 1, pp. 340-345 (2016), a folded-parallel-plate antenna is disclosed that covers the 2.4-GHz and 24-GHz bands. These antennas are reported to have a high profile of 1.73 $\lambda_H$ (21.57 mm).

In Y.-X. Sun, et al., "Substrate-Integrated Two-Port Dual-Frequency Antenna," IEEE Trans. Antennas Propag., vol. 64, p. 3692, (2016), a combined slot antenna and a substrate-integrated dielectric resonator antenna is disclosed that covers the 5.2 GHz and 24 GHz band.

SUMMARY

The exemplified systems and methods provides a low-profile stacked patch multi-frequency antenna (e.g., a dual-frequency antenna), which can be configured to operate at the 5.9-GHz band (DSRC) and the 28-GHz band (5G). With a low-profile, the exemplified systems and methods can be integrated into existing microelectronic packaging systems as well as readily integrated into communication systems having smaller form factor. The design is suitable for use in, and/or integrated with, conventional microelectronic processing techniques. In some embodiments, the exemplified systems and methods would facilitate designs of lower cost communication components and systems as compared to other stacked antenna systems or individually integrated antenna systems.

In some embodiments, the exemplified systems and methods can be used for dual-band operation for DSRC communication (between about 5.85 GHz and about 5.925 GHz) and for 5 G communication (between about 27.5 GHz and about 28.5 GHz). A prototype design is disclosed having a high isolation (>35 dB) and peak gain (7.3 and 13.6 dBi) at both DSRC and 5 G frequency bands and implemented in a small volume and low-profile of 2.7 $\lambda_H$×2.6 $\lambda_H$×0.15 $\lambda_H$, which is indeed suitable for telematics applications, among other applications.

In an aspect, an apparatus (e.g., a stacked patch antenna) is disclosed. The apparatus includes one or more patch antennas, including a first patch antenna comprising a first dielectric substrate having, on a first planar side, a first radiator body in connection with a first set of feedlines (e.g., a single feedline) and, on a second planar side, a reflector ground plane; and, a patch array antenna (e.g., a dielectric resonator antenna) coupled to the first patch antenna to form a stacked structure, wherein the patch array antenna comprises a second dielectric substrate having, on a first planar side, a second radiator body comprising a plurality of distinct radiator body elements in connection with a second set of feedlines (e.g., a single feedline or multiple feedlines) and, on the second planar side, the first patch antenna.

In some embodiments, features of the first radiator body of the first patch antenna are oriented substantially orthogonal (or perpendicular) to features of the second radiator body of the patch array antenna.

In some embodiments, the second radiator body forms a power divider.

In some embodiments, the second radiator body of the patch array antenna comprises a quarter-wave transmission line.

In some embodiments, the first patch antenna comprises a defected ground structure (e.g., wherein the reflector ground plane is configured with the defected ground structure).

In some embodiments, the first radiator body of the first patch antenna substantially overlaps the second radiator body of the patch array antenna.

In some embodiments, the first patch antenna is configured (e.g. optimized) to operate at a first frequency band and the patch array antenna is configured to operate at a second frequency band, wherein a substantial portion of the second frequency band is higher in frequency than a substantial portion of the first frequency band.

In some embodiments, the first frequency band is selected from the group consisting of Wireless LAN antenna frequency band (e.g., 2.4-2.48 GHz & 5.15-5.25 GHz), Multi-application antenna frequency band (e.g., 5.85-5.925 GHz), PCS phone frequency band (e.g., 1.8-1.9 GHz or 2G PCS phone), cellular phone antenna frequency band (e.g., 800-900 MHz & 1.8-1.9 GHz), and toll and parking related on-board unit frequency band (e.g., 909-75-921.75 MHz); and, the second frequency band is selected from the group consisting of 5G wireless frequency band (e.g., 24.25-27.5 GHz, 27.5-28.35 GHz, 31.8-33.4 GHz, 37-40 GHz, 40.5-43.5 GHz) and 60 GHz frequency band.

In some embodiments, each of the patch array antenna and the one or more patch antennas are configured (e.g., optimized) to operate at a set of frequency bands distinct from one another.

In some embodiments, the plurality of distinct radiator body elements of the patch array antenna has a number of antenna elements selected from group consisting of one, two, three, four, five, six, seven, and eight.

In some embodiments, the plurality of distinct radiator body elements of the patch array antenna has a number of antenna elements greater than eight.

In some embodiments, at least one of the plurality of distinct radiator body elements of the patch array antenna has an overall shape selected from the group consisting of a circle, a triangle, a square, an oval, and a rectangle.

In some embodiments, the first patch antenna has an overall shape selected from the group consisting of a circle, a triangle, a square, an oval, and a rectangle.

In some embodiments, the first patch antenna comprise one or more phase-shifting elements coupled to each of the plurality of distinct radiator body elements (e.g., wherein the one or more phase-shifting elements are coupled to each of the second set of feedlines).

In some embodiments, the first set of feedlines of the first patch antenna is configured as a probe feed, an inset-feed, a proximity coupled-feed, or an aperture coupled-feed.

In some embodiments, the second set of feedlines of patch array antenna is configured as a probe feed with corporate feeding network, an inset-feed, a proximity coupled-feed with corporate feeding network, or an aperture coupled-feed with corporate feeding network.

In some embodiments, the apparatus further includes a housing (e.g., a microelectronic package); and a mixed-signal die placed in the housing, the mix-signal die being coupled to a portion of the first set of feedlines or to a portion of second set of feedlines.

In another aspect, a system is disclosed. The system includes a microelectronic package; and, a stacked patch antenna disposed within the microelectronic package, wherein the stacked patch antenna disposed comprises one or more patch antennas, including a first patch antenna comprising a first dielectric substrate having, on a first planar side, a first radiator body in connection with a first set of feedlines (e.g., a single feedline) and, on a second planar side, a reflector ground plane; and, a patch array antenna (e.g., a dielectric resonator antenna) coupled to the first patch antenna to form a stacked structure, wherein the patch array antenna comprises a second dielectric substrate having, on a first planar side, a second radiator body comprising a plurality of distinct radiator body elements in connection with a second set of feedlines (e.g., a single feedline or multiple feedlines) and, on the second planar side, the first patch antenna.

In some embodiments, the includes a mixed-signal die placed in the microelectronic package, the mix-signal die being coupled to a portion of the first set of feedlines or to a portion of second set of feedlines.

In another aspect, a method is disclosed of operating a stacked patch antenna. The method includes directing a first set of electrical signal associated with a first set of frequency bands to, and from, a first patch antenna comprising a first dielectric substrate having, on a first planar side, a first radiator body in connection with a first set of feedlines (e.g., a single feedline) and, on a second planar side, a reflector ground plane; and directing a second set of electrical signal associated with a second set of frequency bands to, and from, a patch array antenna coupled to the first patch antenna, wherein the patch array antenna is coupled to the first patch antenna to form a stacked structure, and wherein the patch array antenna comprises a second dielectric substrate having, on a first planar side, a second radiator body comprising a plurality of distinct radiator body elements in connection with a second set of feedlines (e.g., a single feedline or multiple feedlines) and, on the second planar side, the first patch antenna.

BRIEF DESCRIPTION OF THE DRAWINGS

The accompanying drawings, which are incorporated in and constitute a part of this specification, illustrate embodiments and together with the description, serve to explain the principles of the methods and systems. The patent or application file contains at least one drawing executed in color. Copies of this patent or patent application publication with color drawing(s) will be provided by the Office upon request and payment of the necessary fee.

Color drawings have been submitted in this application. The color drawings are necessary as the only practical medium by which aspects of the claimed subject matter may be accurately conveyed. For example, the claimed invention relates to an antenna design and the color drawings are of experimental results showing performance of the antenna design, which may be necessary to illustrate features of the claims.

The components in the drawings are not necessarily to scale relative to each other and like reference numerals designate corresponding parts throughout the several views:

FIG. 1 is a diagram of a low-profile stacked patch multi-frequency antenna in accordance with an illustrative embodiment.

FIG. 2 shows a diagram of an assembly view of the low-profile stacked patch multi-frequency antenna of FIG. 1 in accordance with an illustrative embodiment.

FIG. 3 shows an example probe feedline for the patch antenna in accordance with an illustrative embodiment.

FIG. 4 shows another example probe feedline with a set of one or more gaps in accordance with an illustrative embodiment.

FIG. 5 shows an example L-shape probe feedline for the patch antenna in accordance with an illustrative embodiment.

Figure 6A:
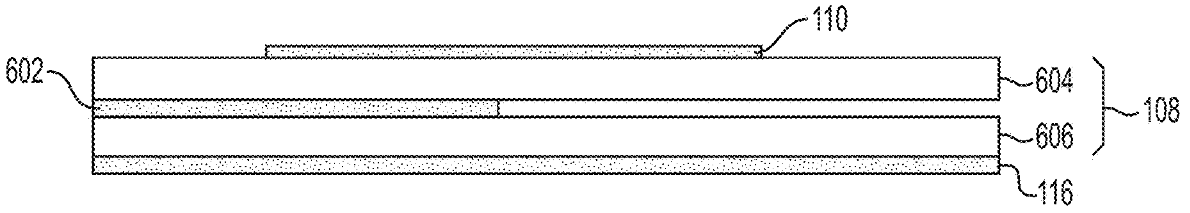
Figure 6B:
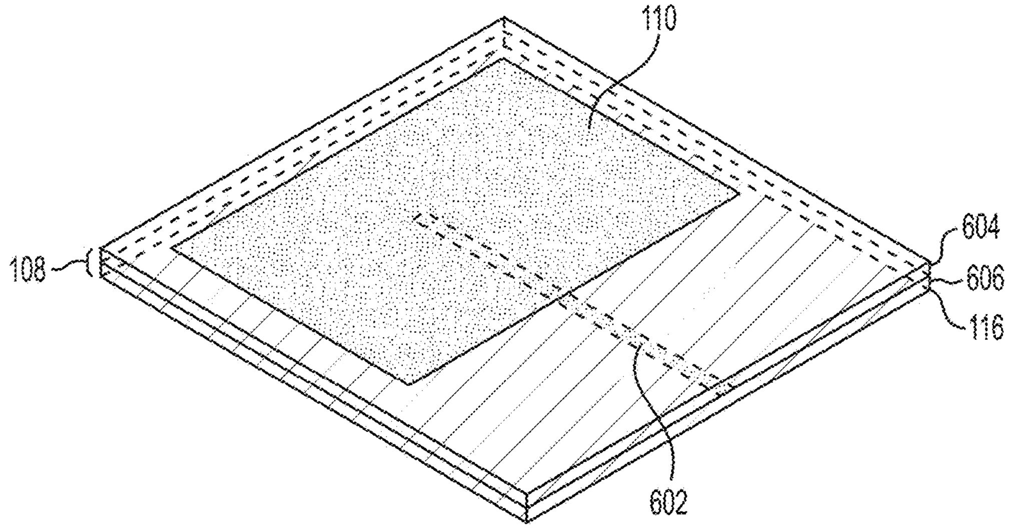

FIGS. 6A and 6B, collectively, show an example proximity-coupled feedline in accordance with an illustrative embodiment.

Figure 7A:
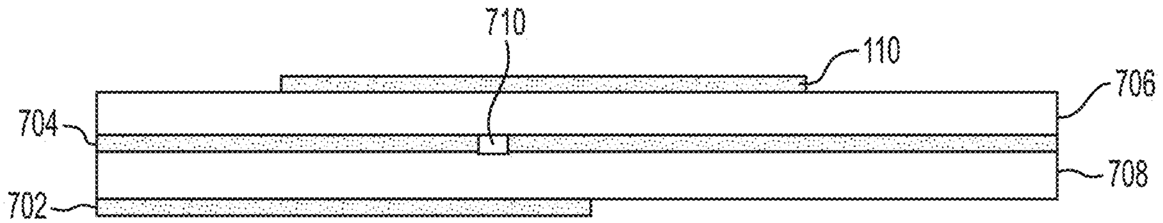
Figure 7B:
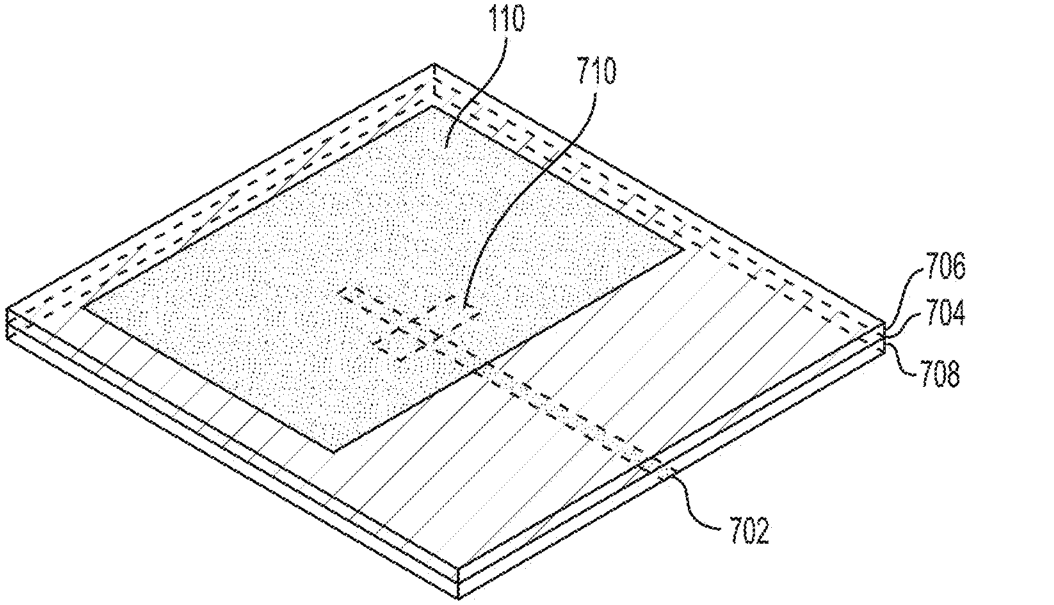

FIGS. 7A and 7B, collectively, show an example aperture coupled feedline 702 in accordance with an illustrative embodiment.

Figure 8:
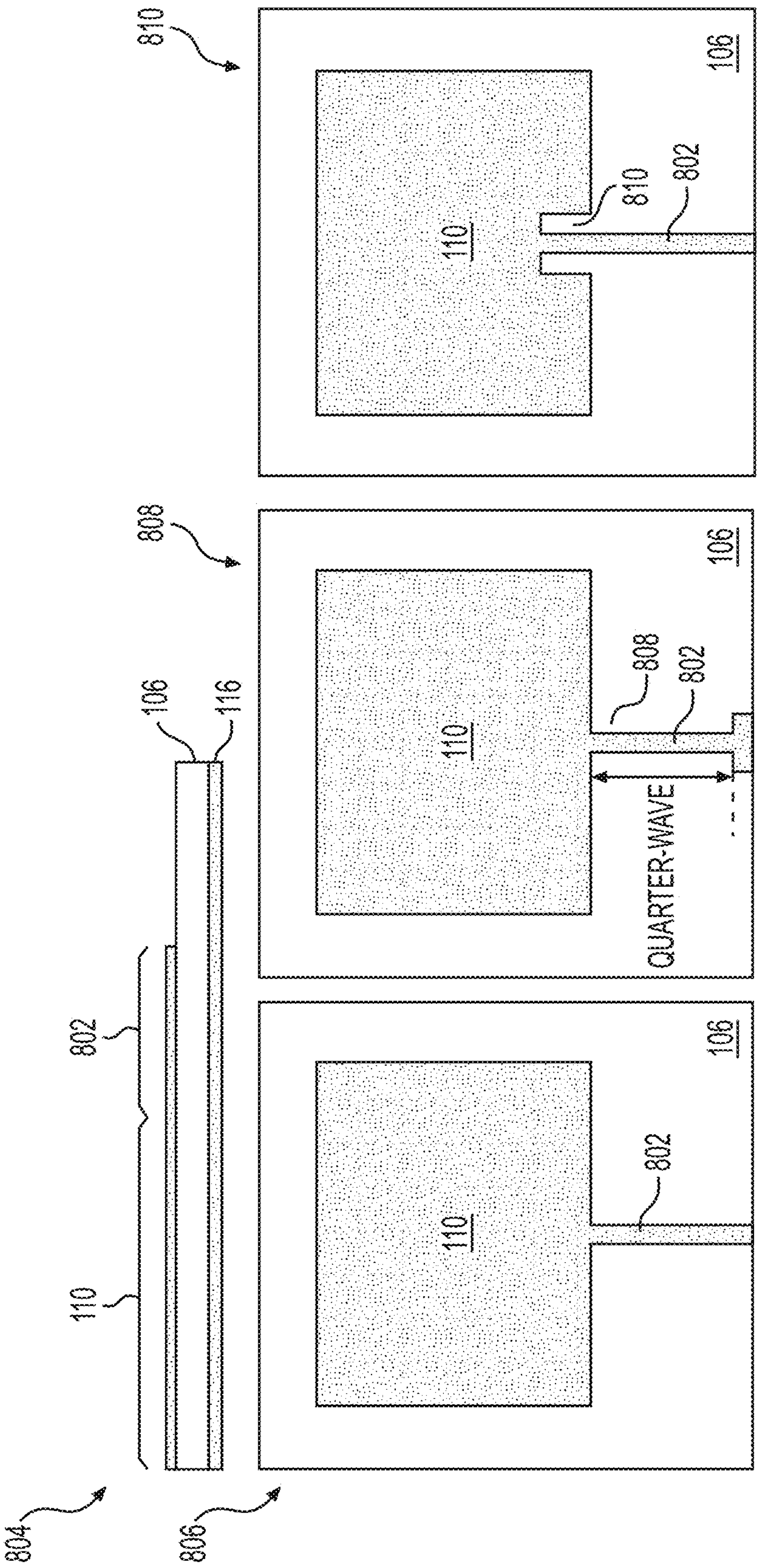

FIG. 8 shows examples of microstrip edge feedline in accordance with an illustrative embodiment.

Figure 9:
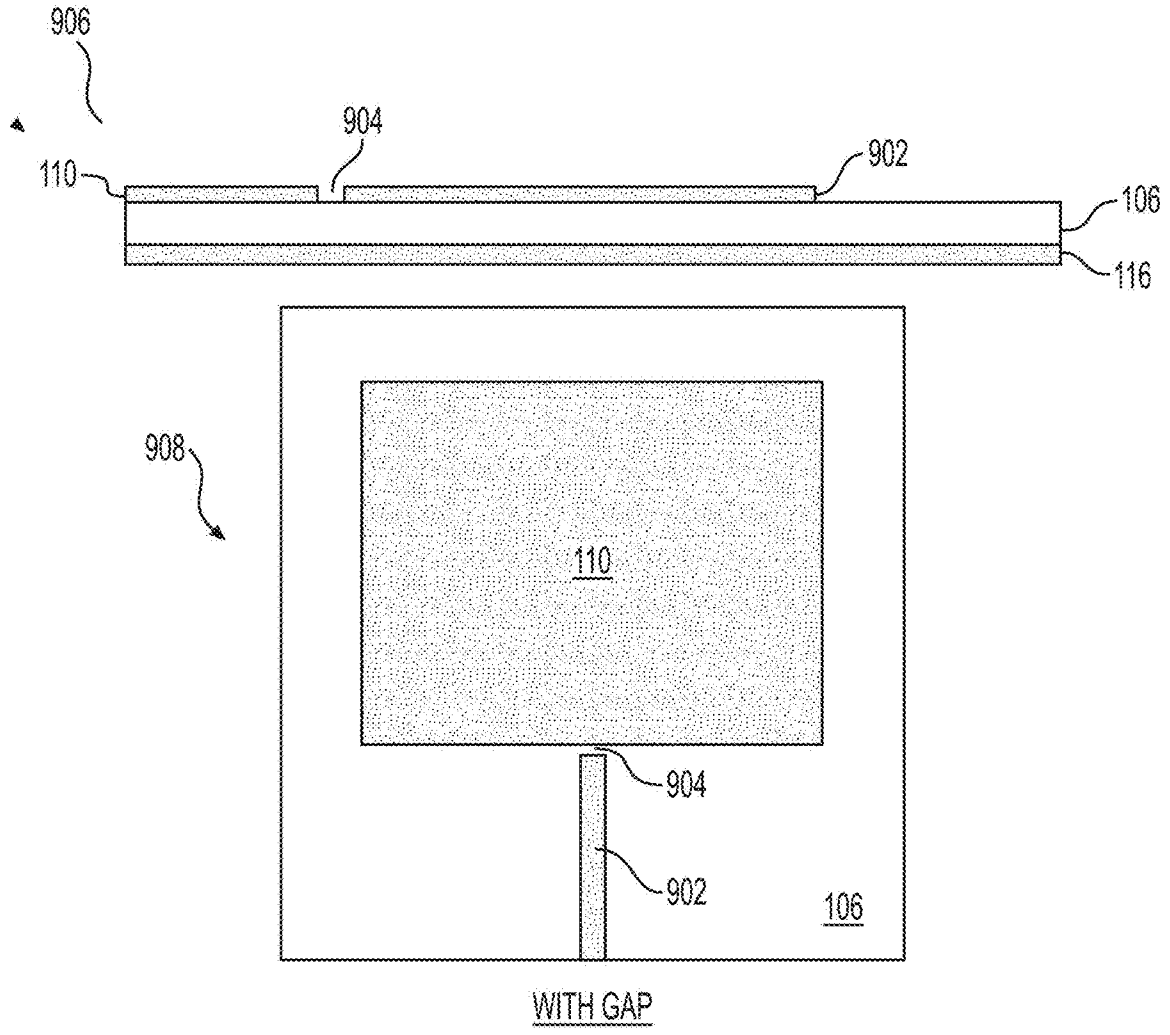

FIG. 9 shows examples of microstrip edge feedlines with a gap in accordance with an illustrative embodiment.

Figure 10:
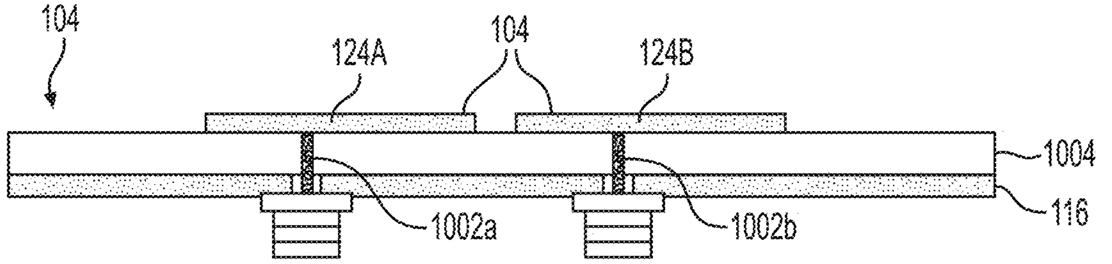

FIG. 10 shows an example probe feedline for an array patch antenna in accordance with an illustrative embodiment.

Figure 11:
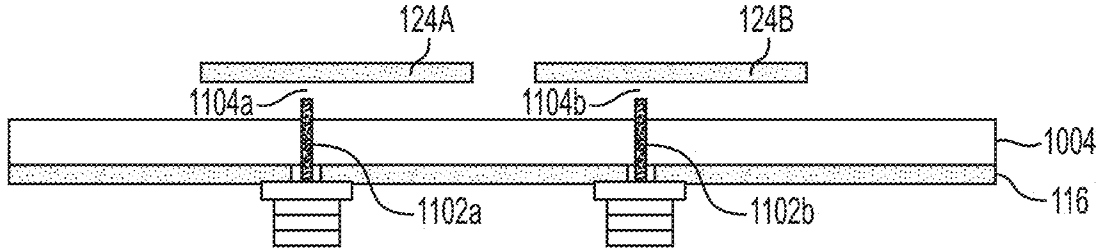

FIG. 11 shows example probe feedlines with gaps in accordance with an illustrative embodiment.

Figure 12:
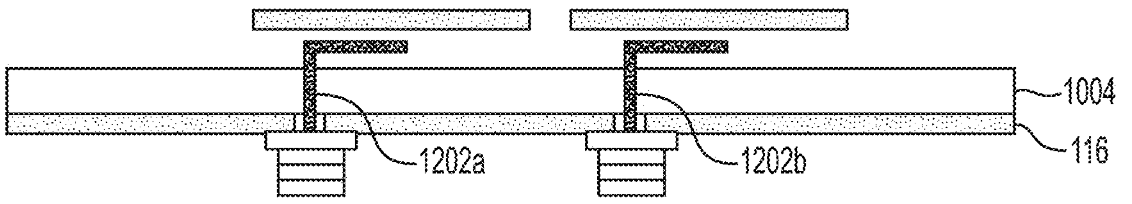

FIG. 12 shows example L-shape probe feedlines for the array patch antenna in accordance with an illustrative embodiment.

Figure 13:
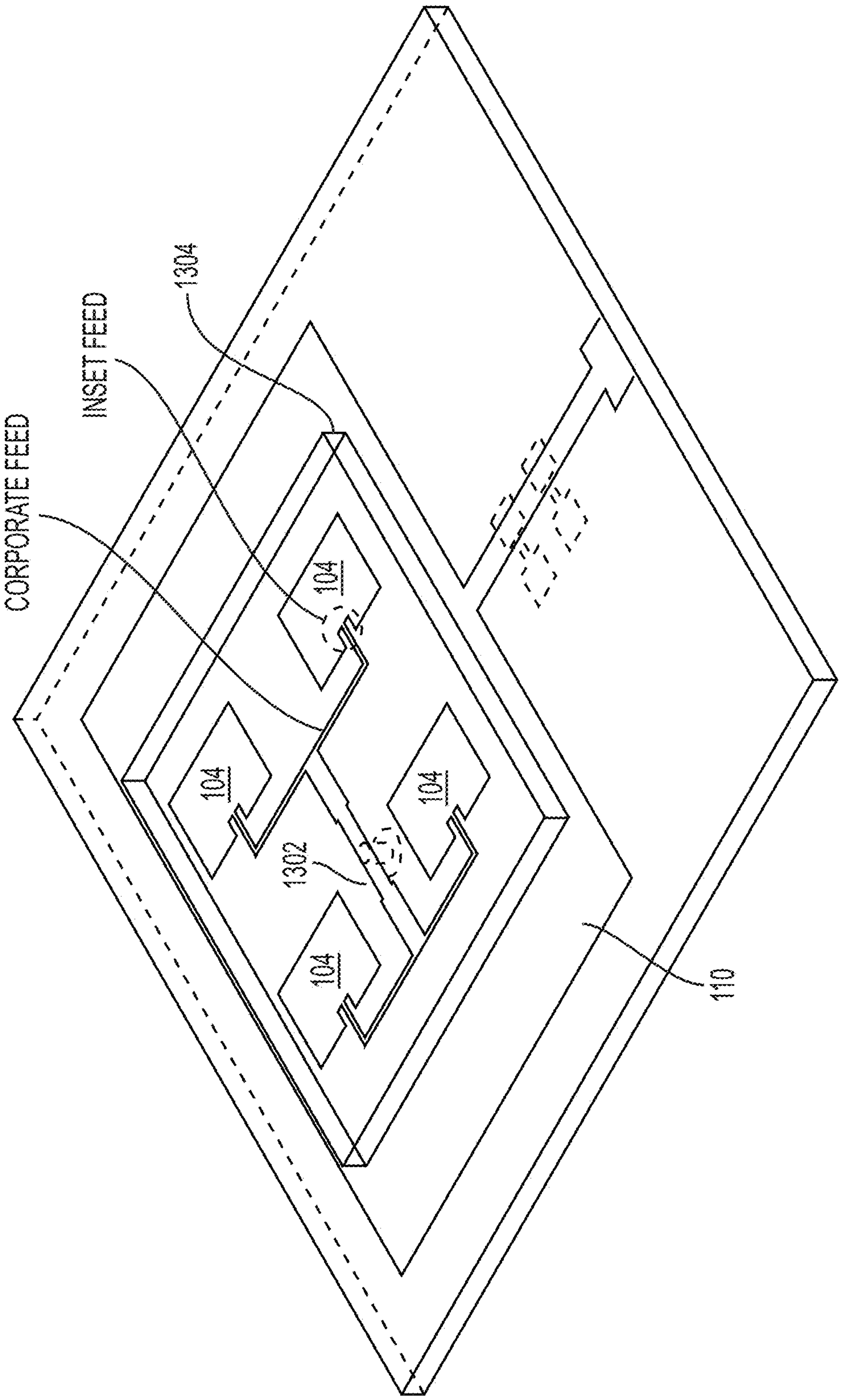

FIG. 13 shows example feeding comprising proximity-coupled feeds and aperture-coupled feeds for the array patch antenna configured in a corporate feeding network in accordance with an illustrative embodiment.

Figures 14A, 14B:
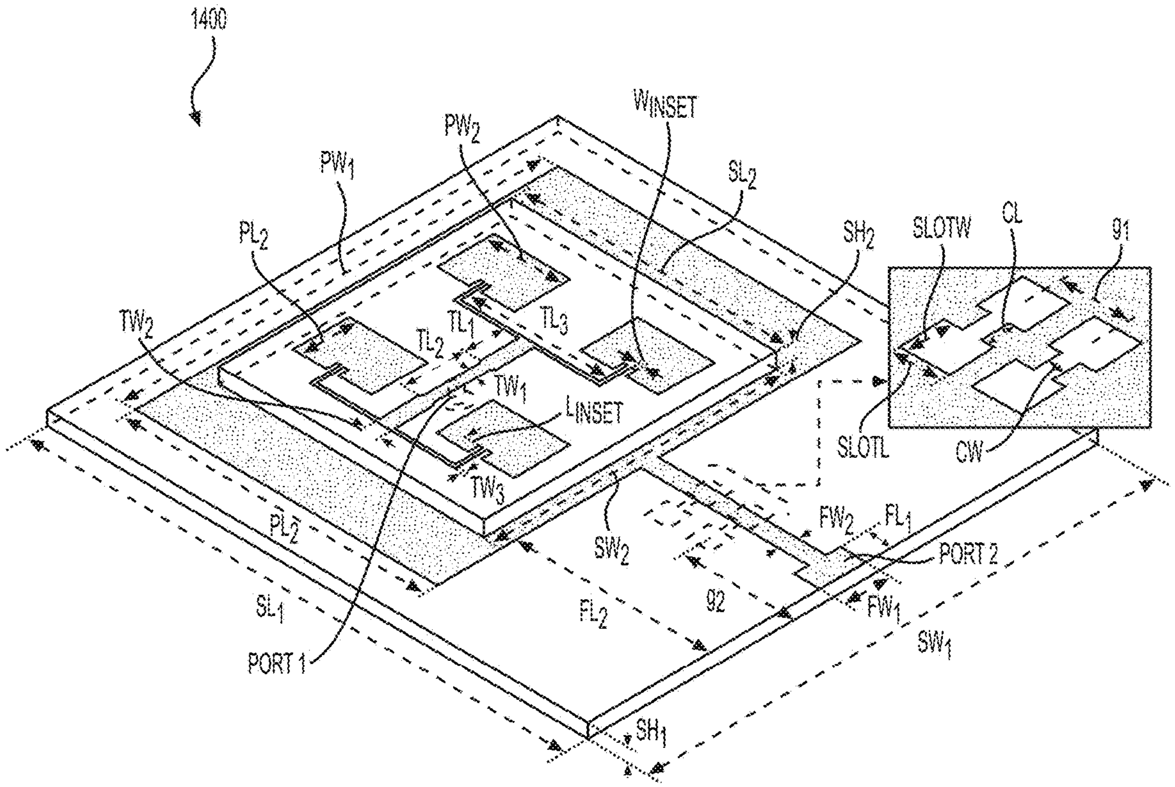

FIG. 14A and FIG. 14B show an example design of a low-profile stacked patch dual-frequency antenna in accordance with an illustrative embodiment.

Figure 14C:
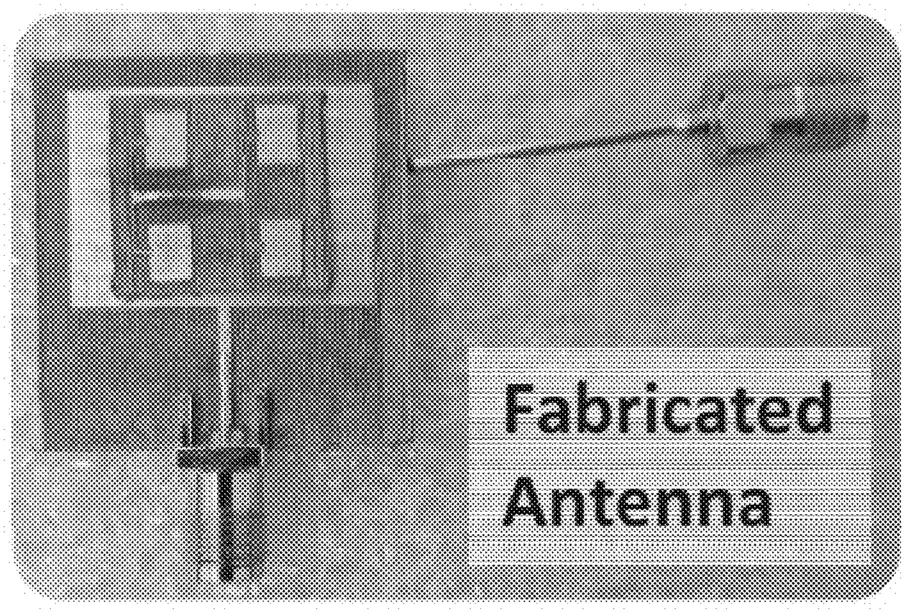

FIG. 14C shows a fabricated low-profile stacked patch dual-frequency antenna of FIGS. 14A and 14B in accordance with an illustrative embodiment.

Figure 14D:
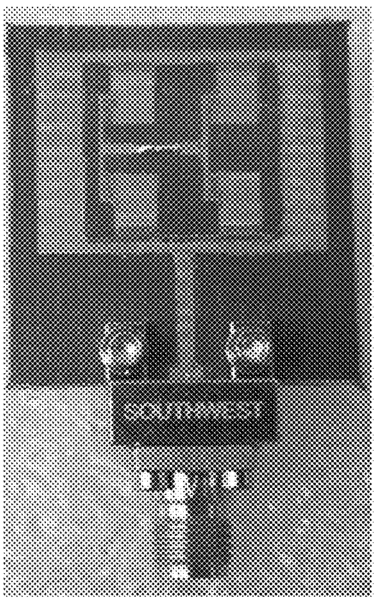

FIG. 14D shows another fabricated low-profile stacked patch dual-frequency antenna of FIGS. 14A and 14B in accordance with an illustrative embodiment.

Figure 15:
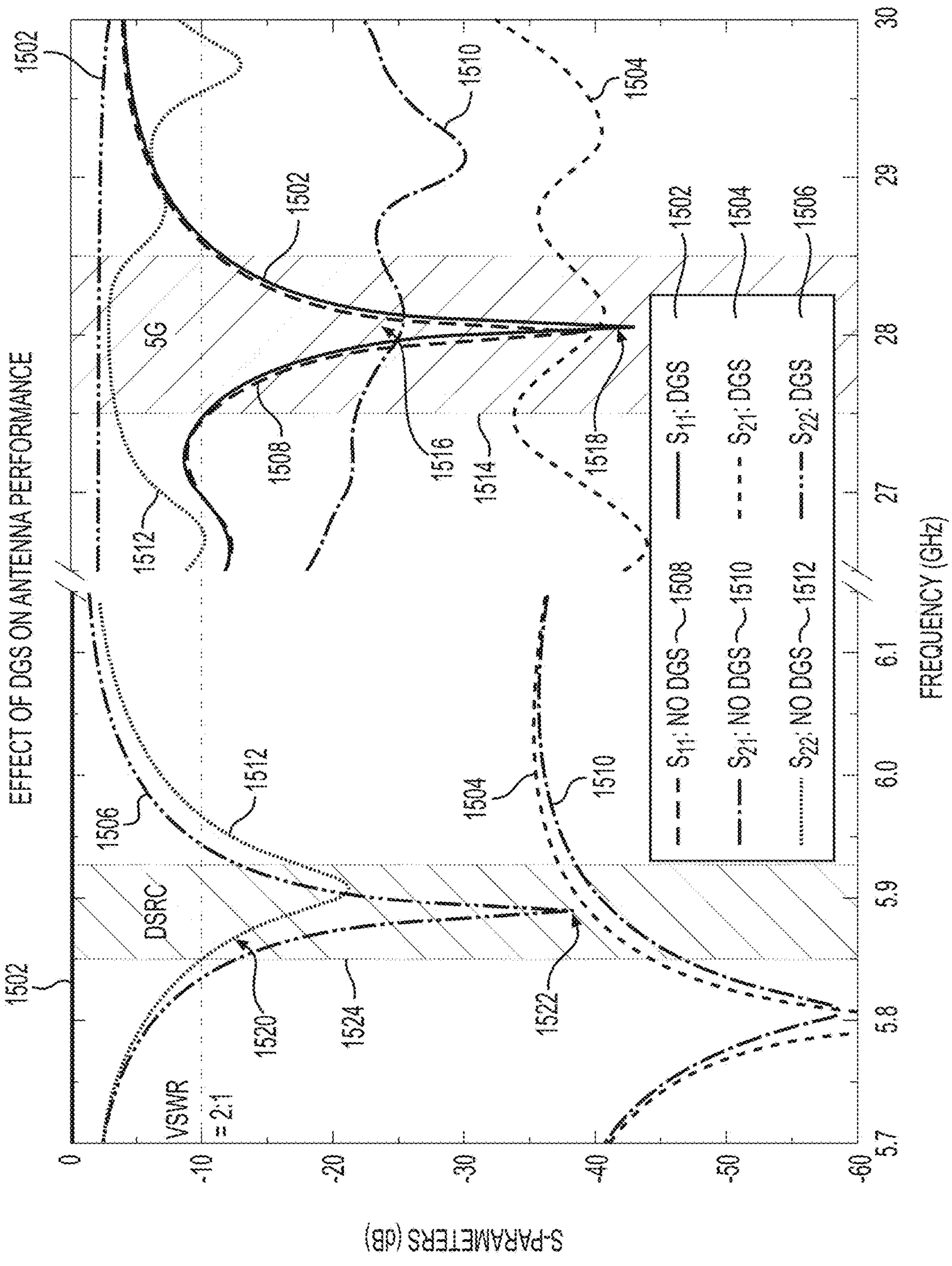

FIG. 15 shows simulated frequency dependent S-parameters characteristics of the low-profile dual-frequency patch antenna of FIG. 14C in accordance with an illustrative embodiment.

Figure 16A:
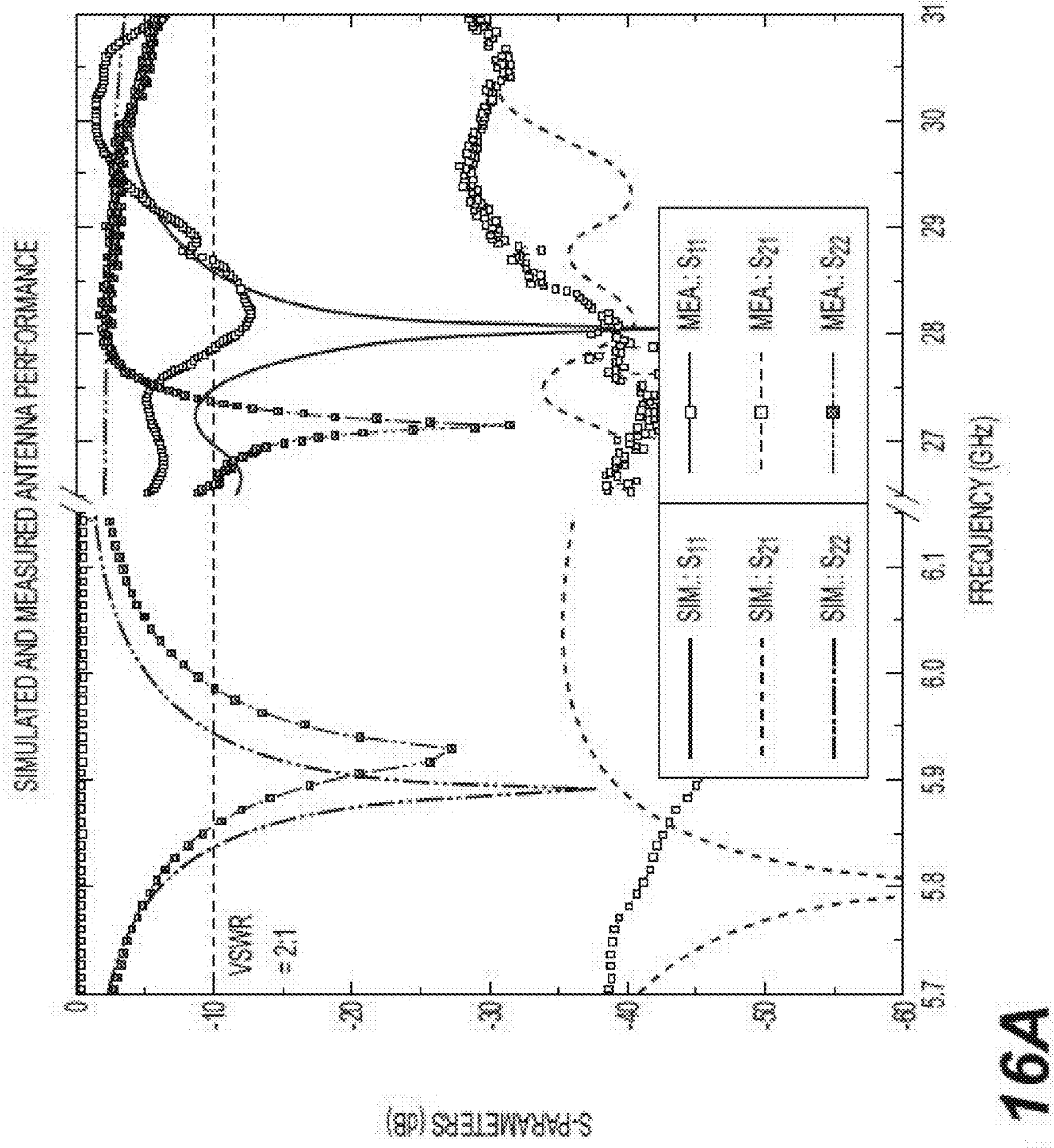

FIG. 16A shows measured frequency dependent S-parameters characteristics of the low-profile dual-frequency patch antenna of FIG. 14C in accordance with an illustrative embodiment.

Figure 16B:
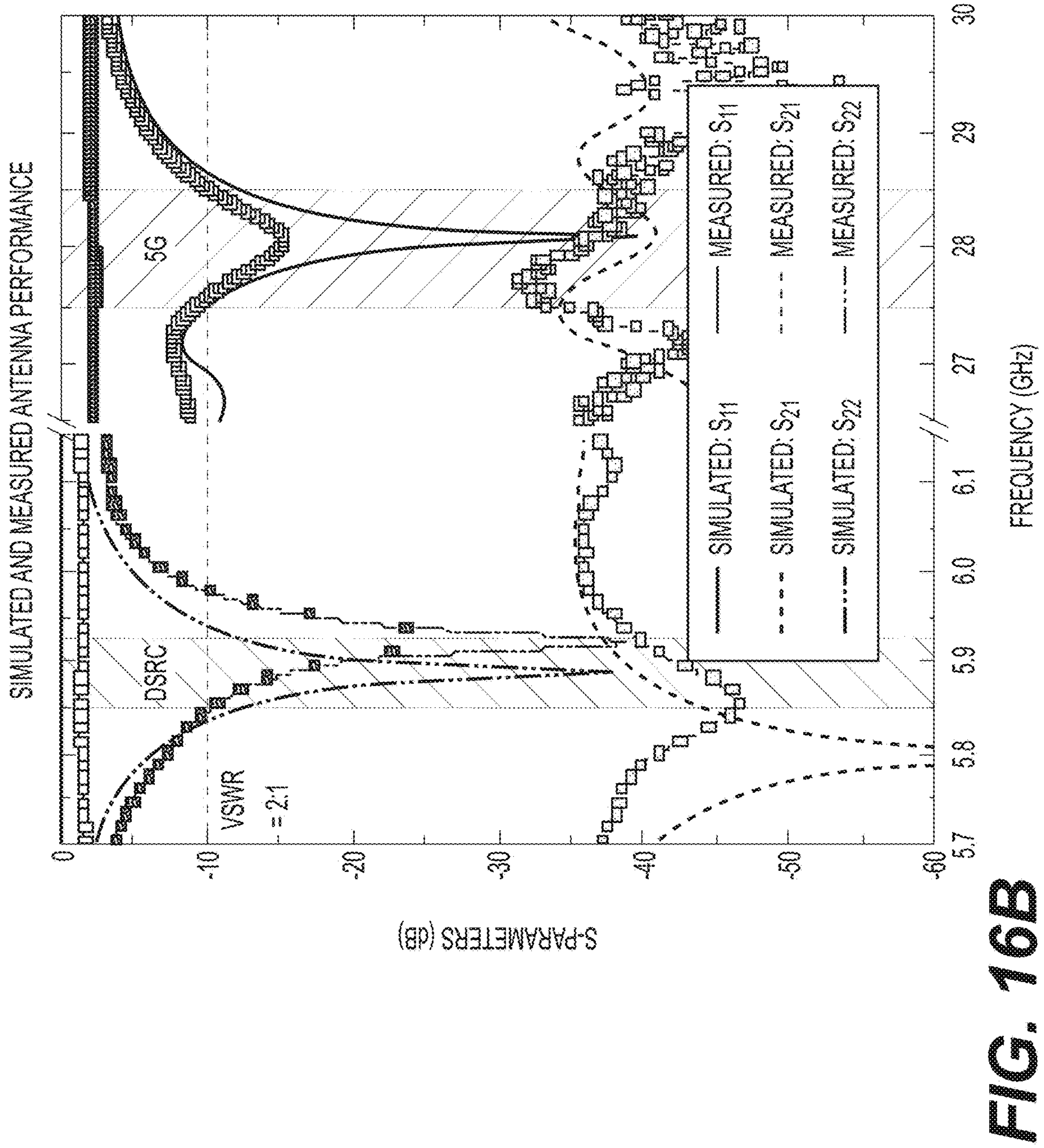

FIG. 16B shows another measured frequency dependent S-parameters characteristics of the low-profile dual-frequency patch antenna of FIG. 14D in accordance with an illustrative embodiment.

Figure 17A:
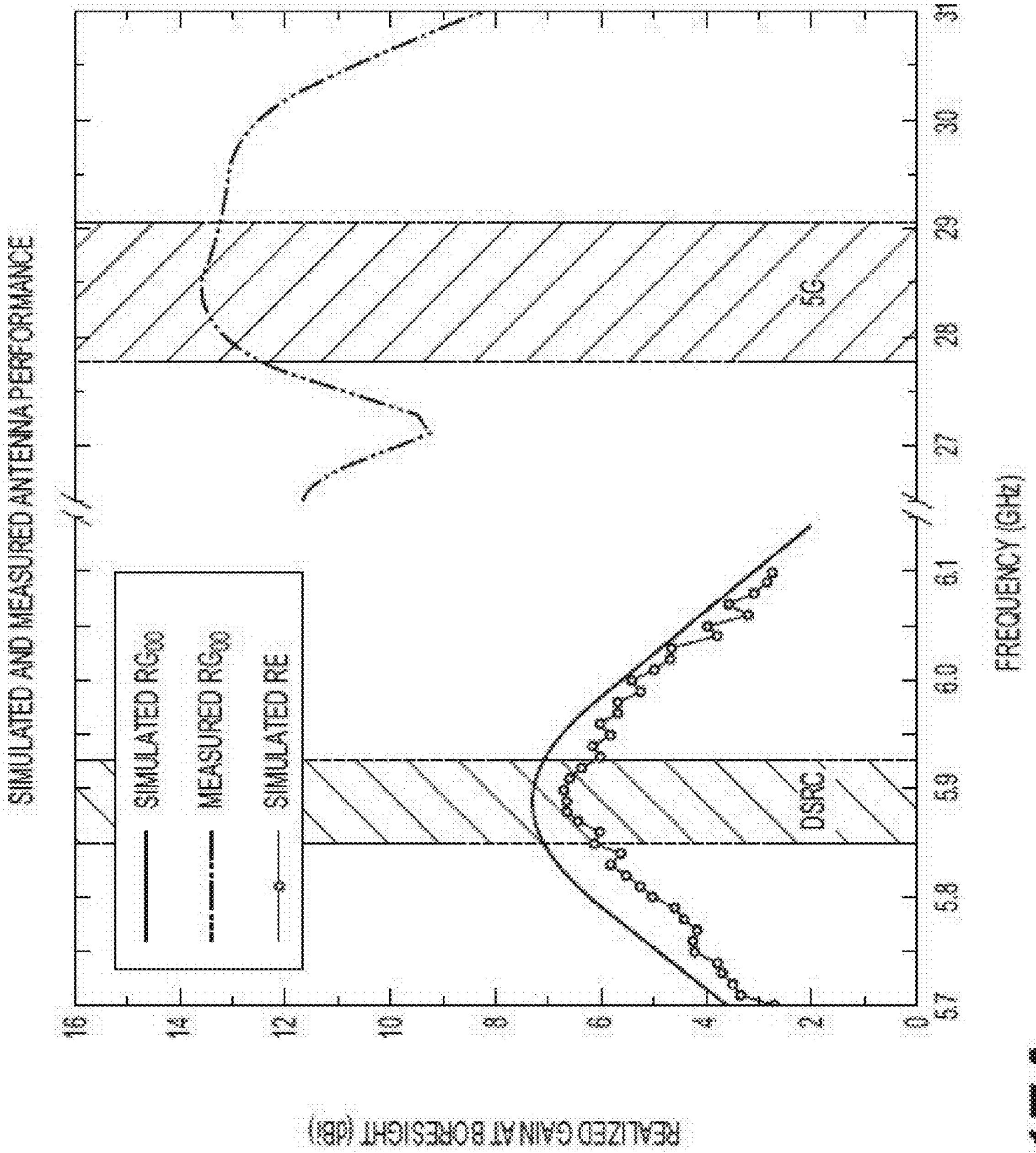

FIG. 17A shows simulated and measured frequency dependent realized gain at boresight (in dBi) of the low-profile dual-frequency patch antenna of FIG. 14C in accordance with an illustrative embodiment.

Figure 17B:
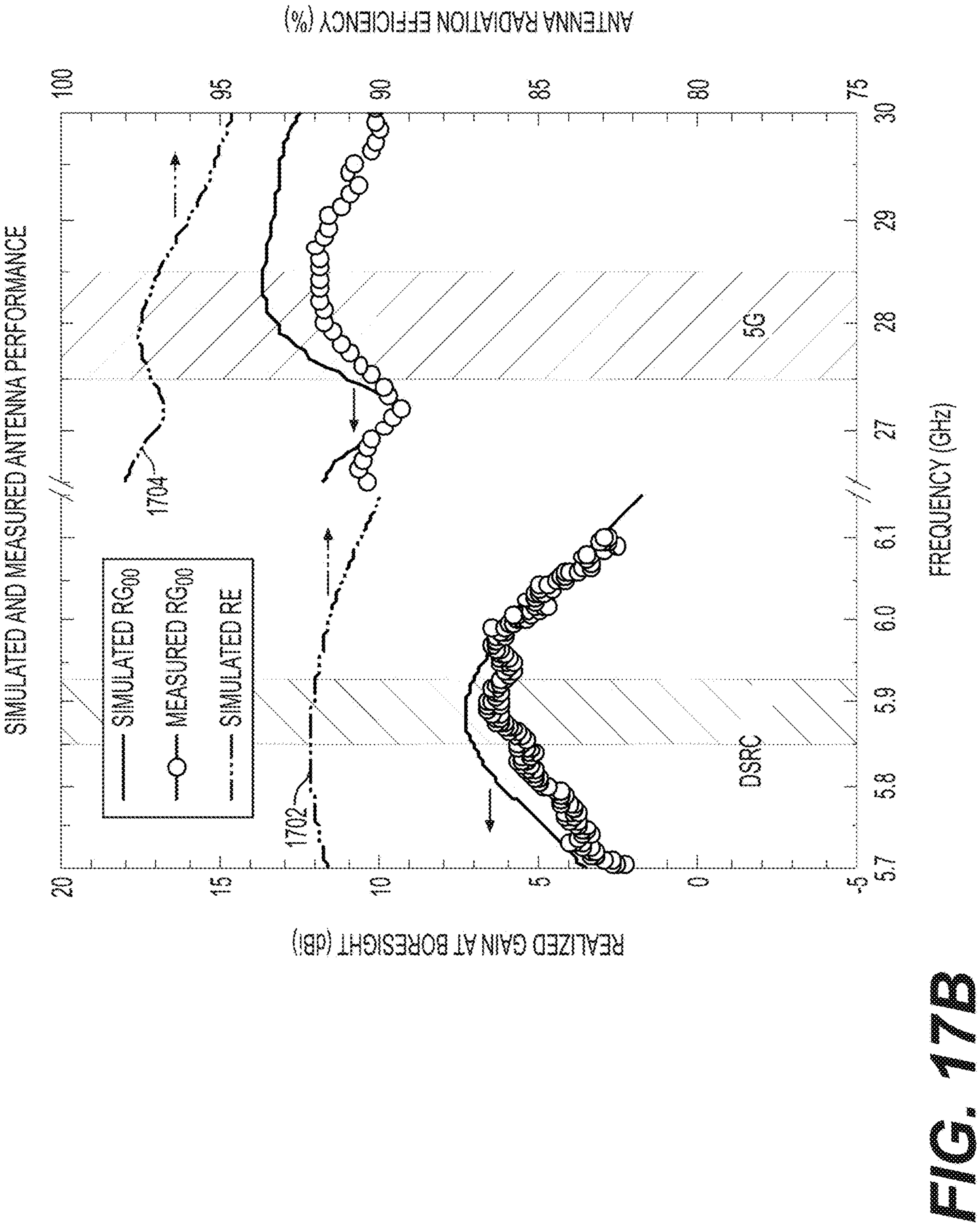

FIG. 17B shows another simulated and measured frequency dependent realized gain at boresight (in dBi) of the low-profile dual-frequency patch antenna of FIG. 14D in accordance with an illustrative embodiment.

Figure 18A:
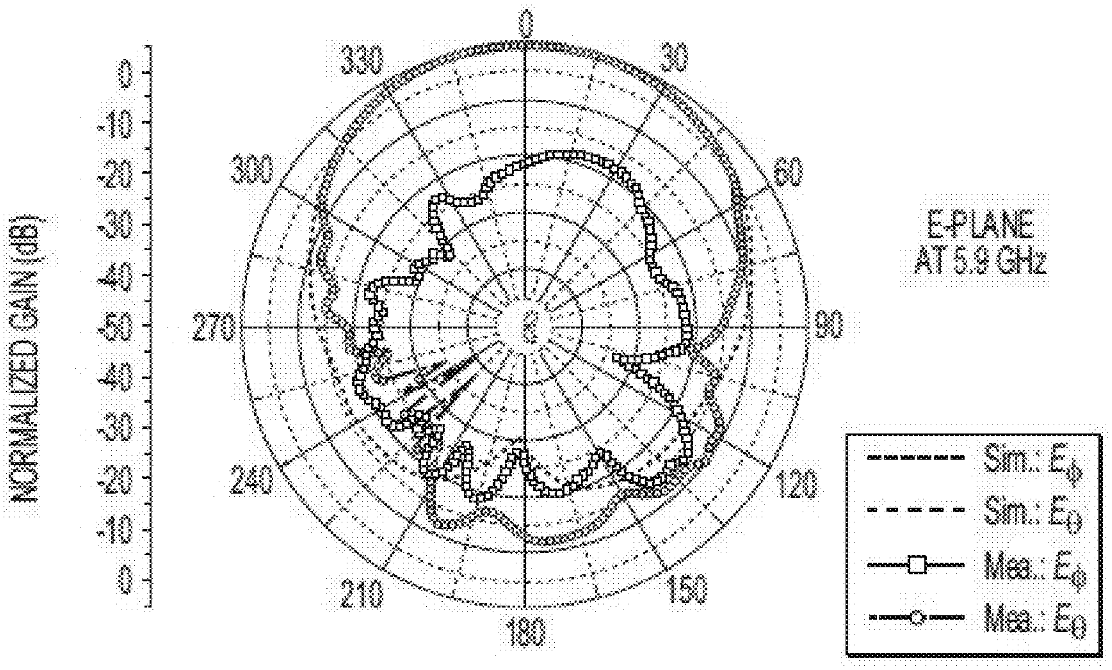
Figure 19A:
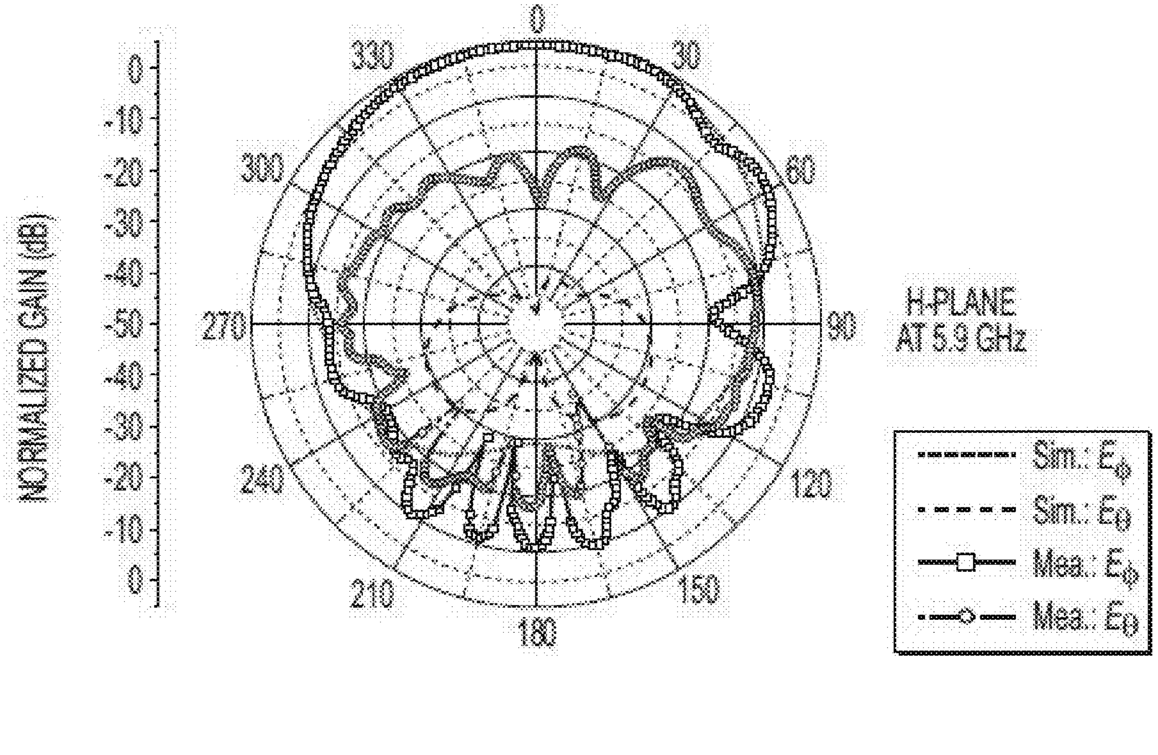

FIGS. 18A and 19A show simulated and measured normalized E-plane and H-plane radiation patterns of the low-profile dual-frequency antenna of FIG. 14C when radiating at about 5.9 GHz in accordance with an illustrative embodiment.

Figure 18B:
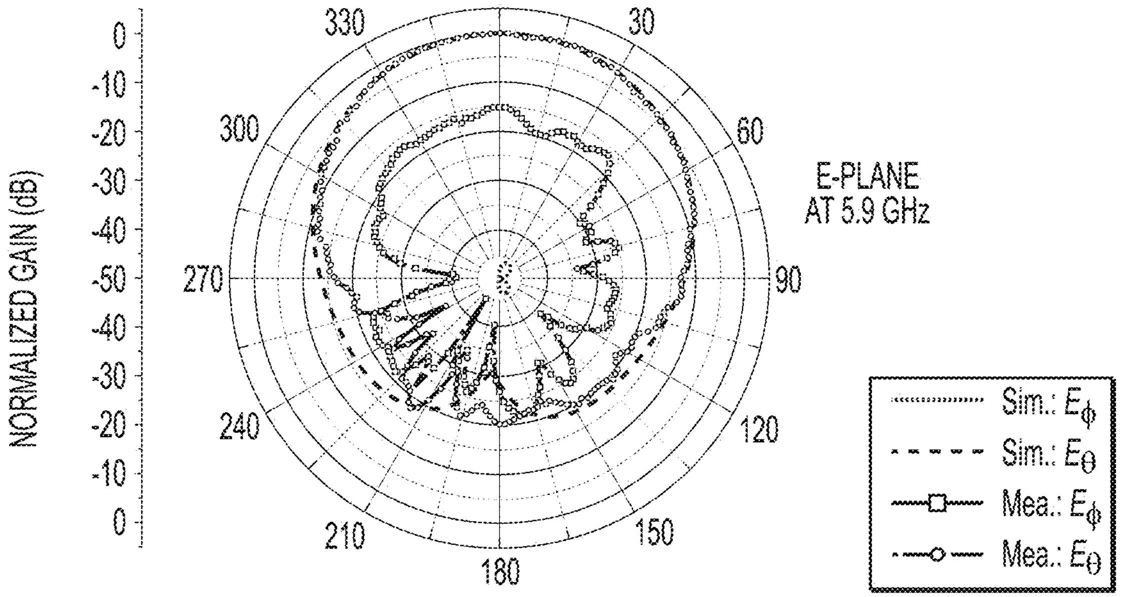
Figure 19B:
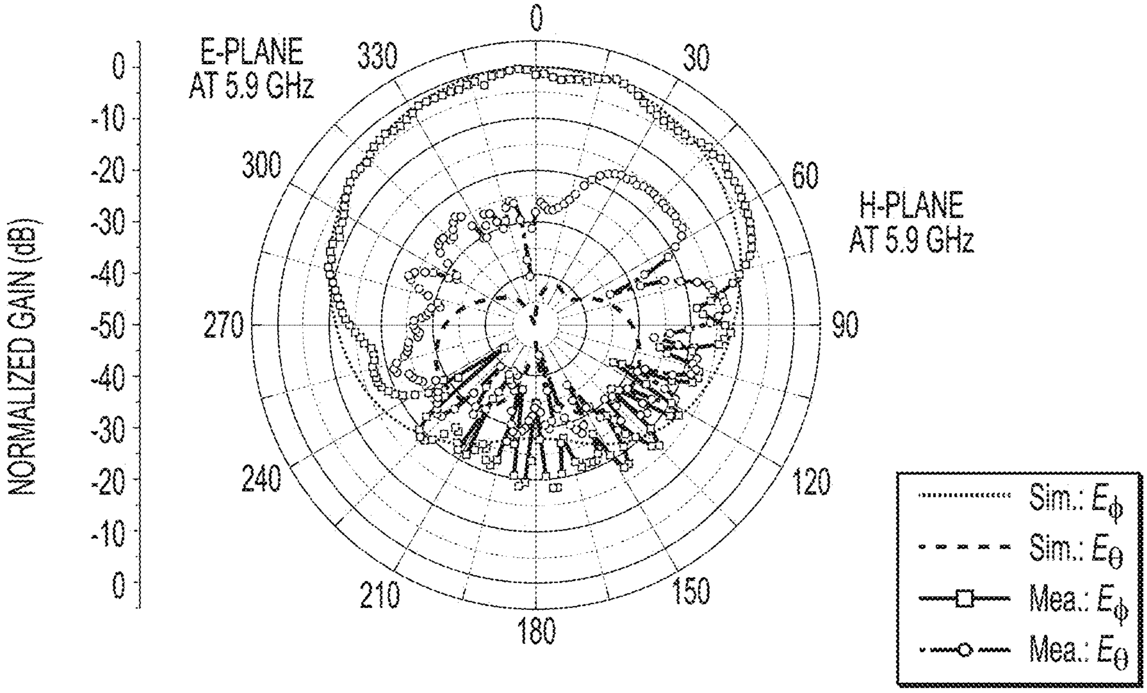

FIGS. 18B and 19B show another simulated and measured normalized E-plane and H-plane radiation patterns of the low-profile dual-frequency antenna of FIG. 14D when radiating at about 5.9 GHz in accordance with an illustrative embodiment.

Figure 20A:
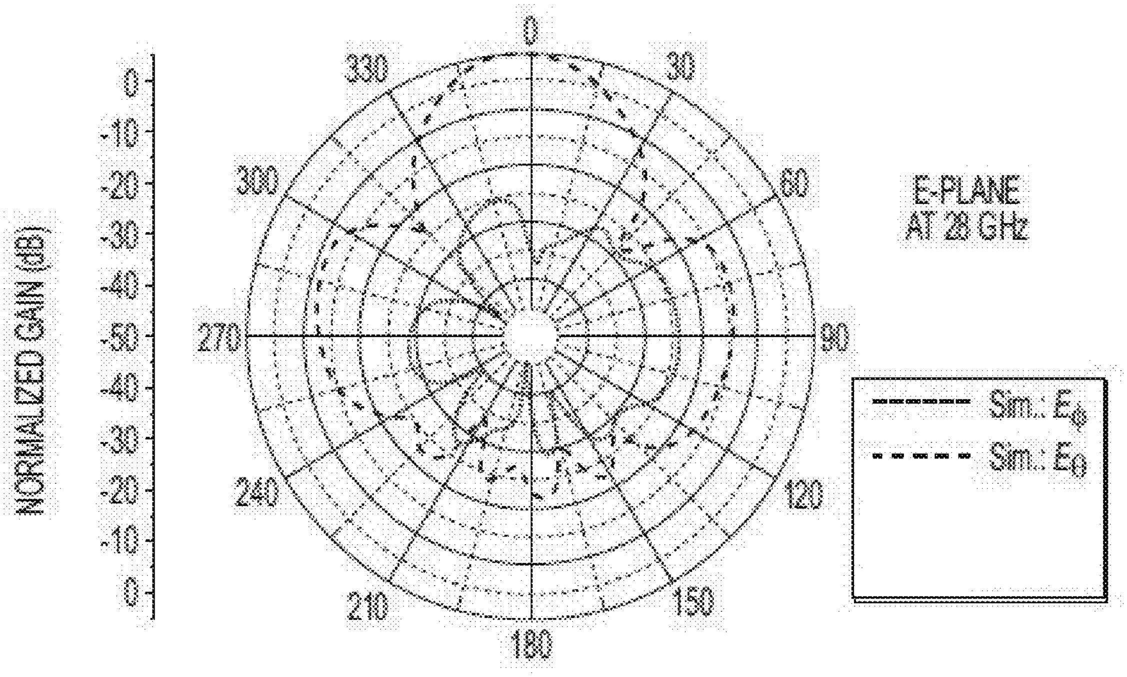
Figure 21A:
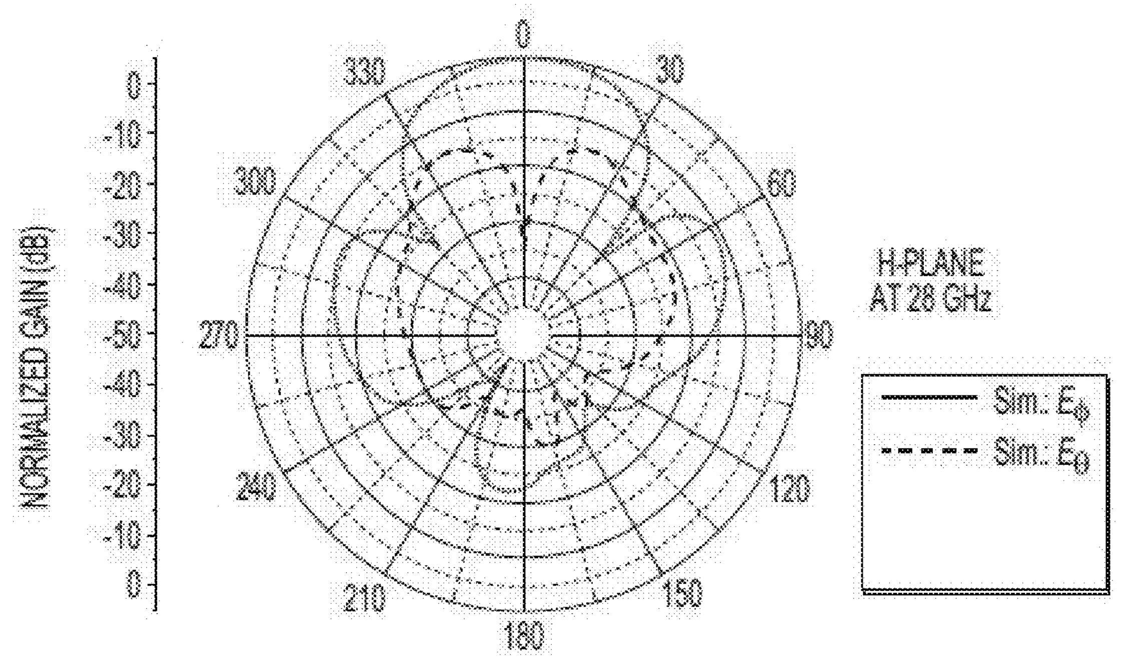

FIGS. 20A and 21A show simulated and measured normalized E-plane and H-plane radiation patterns of the low-profile dual-frequency antenna of FIG. 14C when radiating at about 28 GHz in accordance with an illustrative embodiment.

Figure 20B:
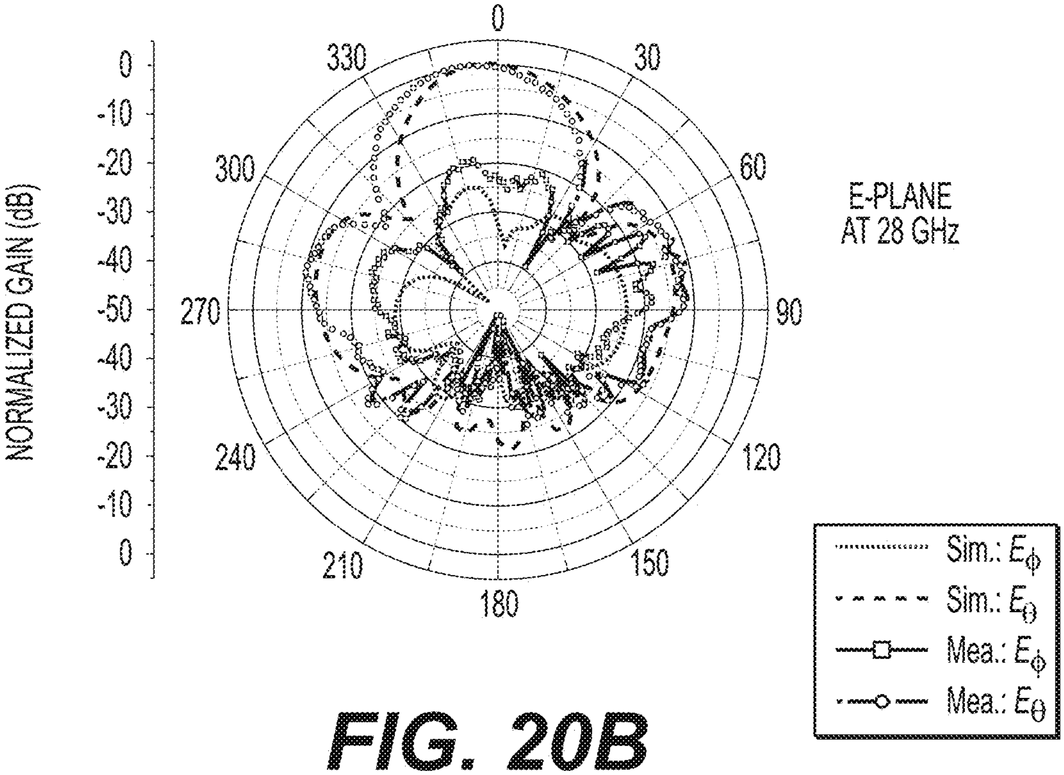
Figure 21B:
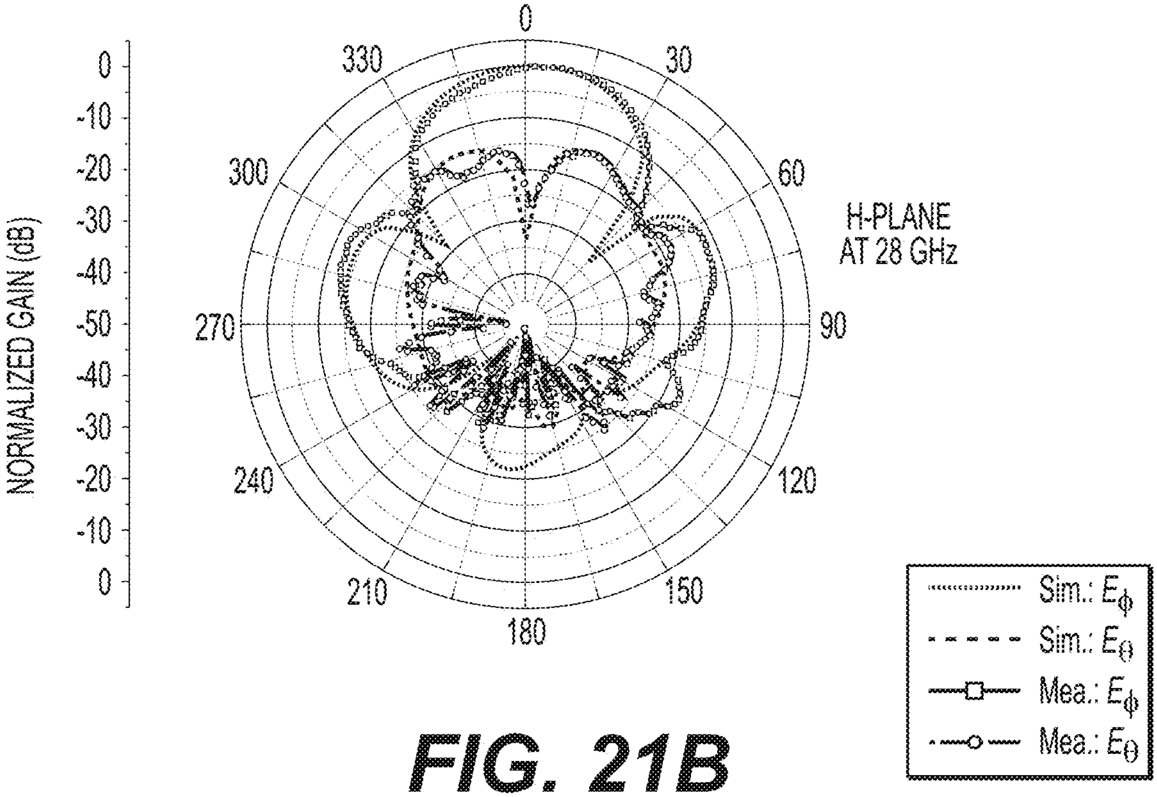

FIGS. 20B and 21B show another simulated and measured normalized E-plane and H-plane radiation patterns of the low-profile dual-frequency antenna of FIG. 14D when radiating at about 28 GHz in accordance with an illustrative embodiment.

Figure 22:
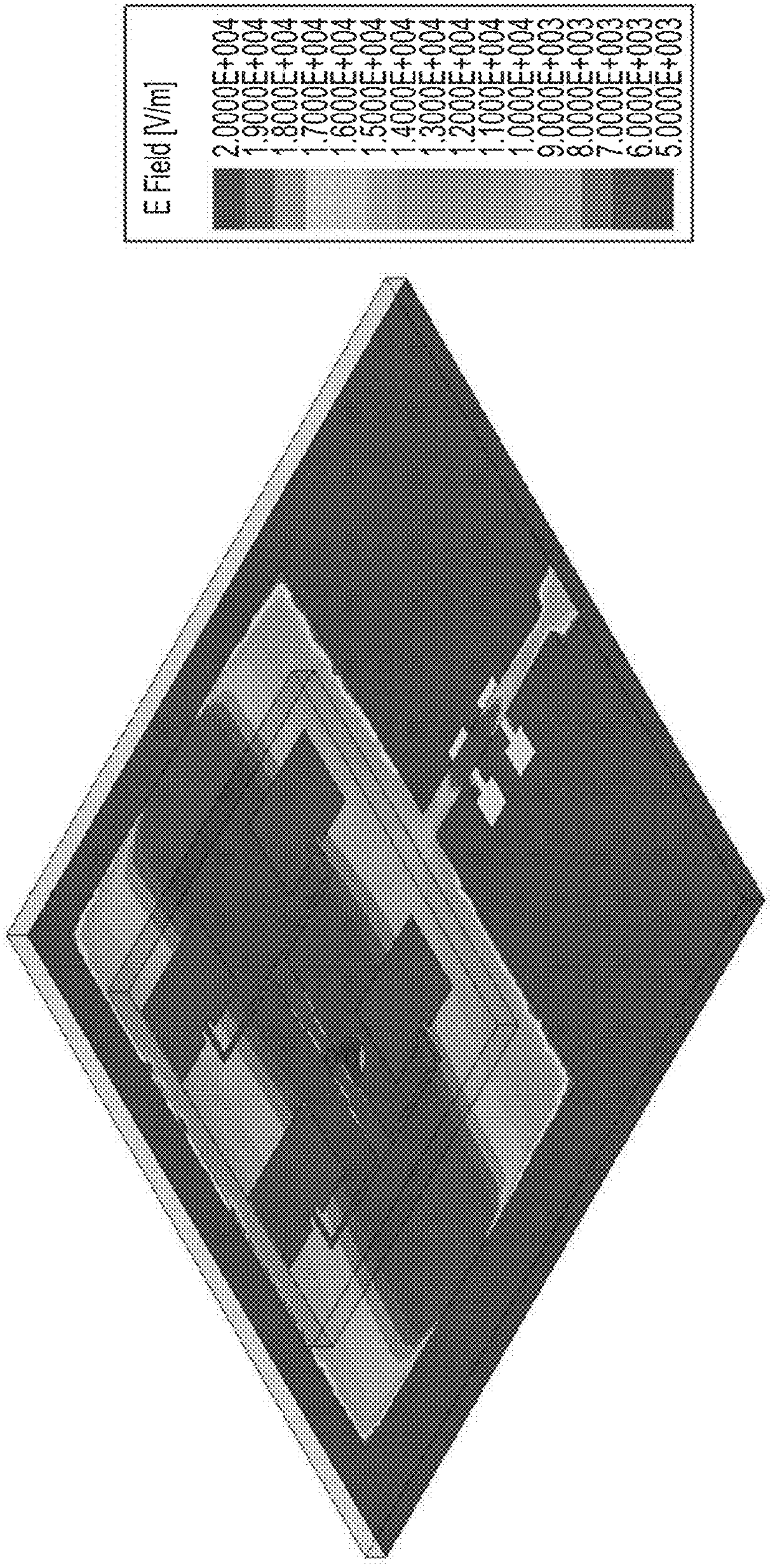
Figure 23:
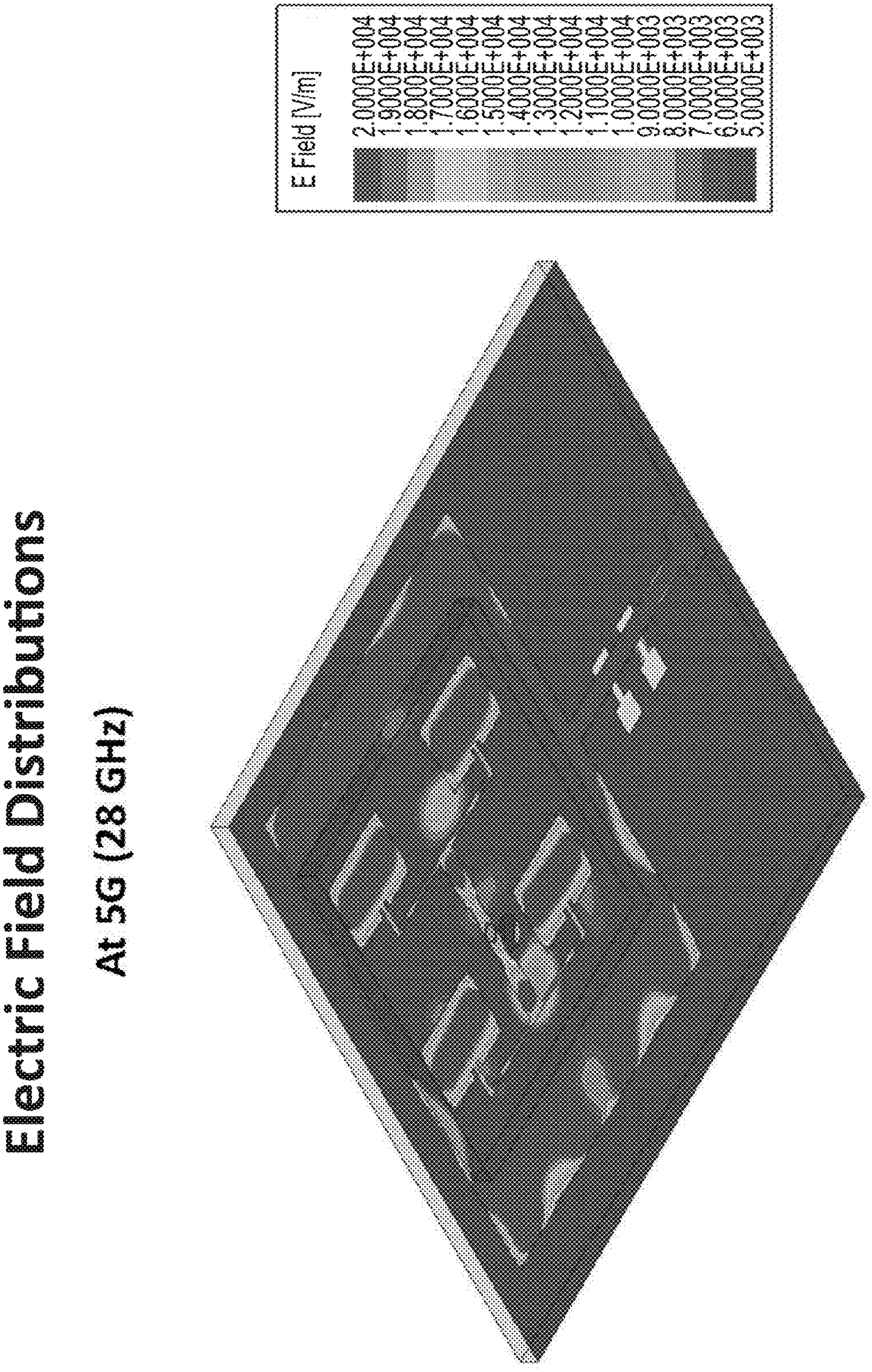

FIGS. 22 and 23 show simulated electric field distribution characteristics of the low-profile dual-frequency antenna of FIG. 14 when radiating at about 5.9 GHz and at about 28 GHz, respectively, in accordance with an illustrative embodiment.

FIG. 24 is a table showing comparative characteristics and performance of the low-profile dual-frequency antenna of FIG. 14 with other reported dual-frequency antennas in the technical literature in accordance with an illustrative embodiment.

Figure 25:
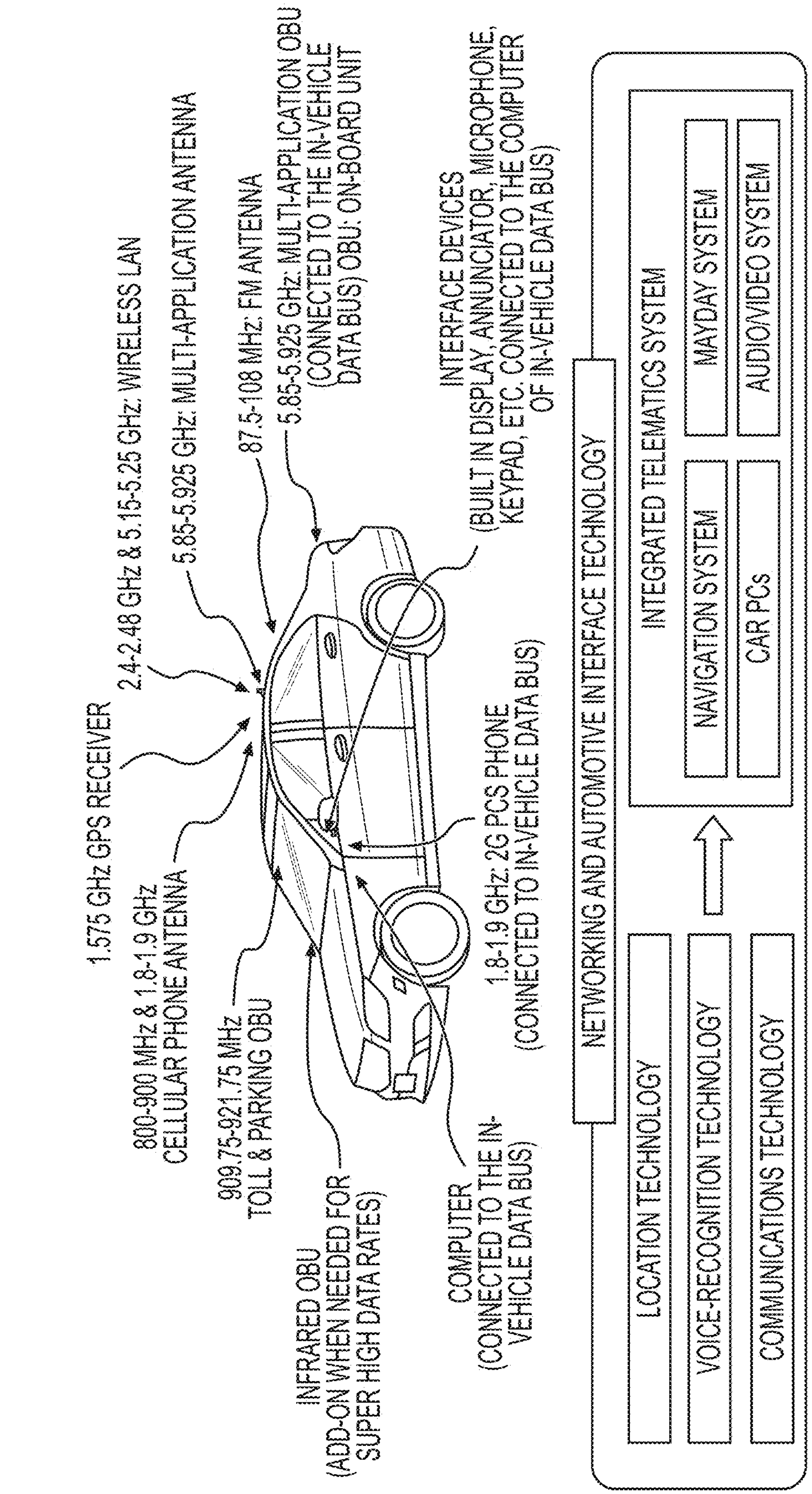

FIG. 25 is a diagram of example telematics applications for safety, navigation, communication, entertainment, toll and parking, autonomous operation, among others.

DETAILED SPECIFICATION

Each and every feature described herein, and each and every combination of two or more of such features, is included within the scope of the present invention provided that the features included in such a combination are not mutually inconsistent.

Figure 1:
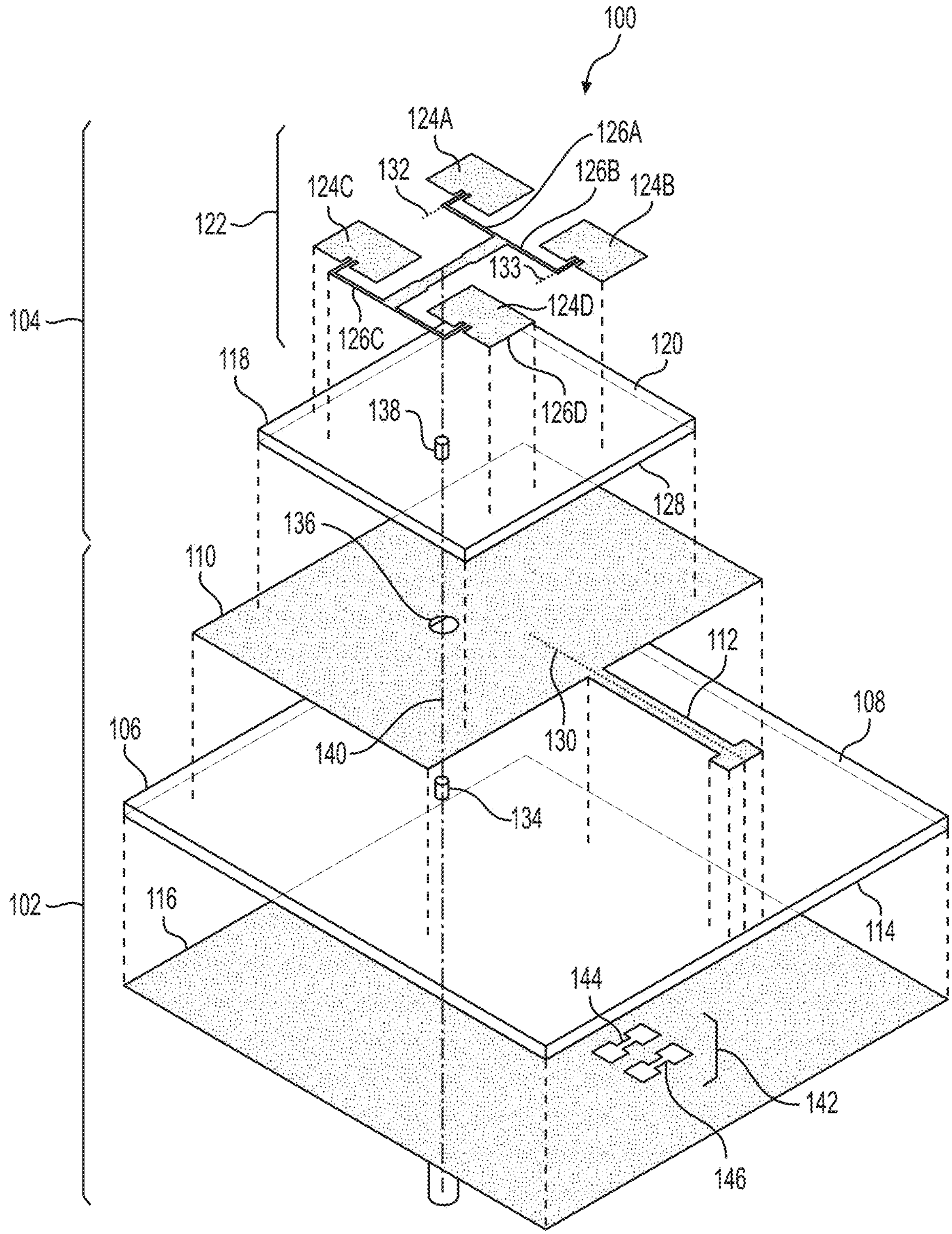

FIG. 1 is a diagram of a low-profile stacked patch multi-frequency antenna 100 in accordance with an illustrative embodiment. As shown in FIG. 1, the low-profile stacked patch multi-frequency antenna 100 includes a patch antenna 102 coupled to a patch array antenna 104 so as to form a stacked structure having a low profile.

The patch antenna 102 (also referred to herein as the "first patch antenna") is formed of a first dielectric substrate 106 (shown as "Layer IV-Substrate II") having, on a first planar side 108, a first radiator body 110 (shown as "Layer III-Patch Antenna (DSRC)") in connection with a first set of feedlines 112 (shown as a single feedline). The patch antenna 102 has, on a second planar side 114, a reflector ground plane 116 (shown as "Layer V-Ground").

The patch array antenna 104 (shown as "Layer I-Patch Array (5G)") includes a second dielectric substrate 118 (shown as "Layer II-Substrate I") having, on a first planar side 120, a second radiator body 122 comprising a plurality of distinct radiator body elements 124 (shown as 124*a*, 124*b*, 124*c*, and 124*d*) in connection with a second set of feedlines 126 (shown as 126*a*, 126*b*, 126*c*, and 126*d*). The patch array antenna 104 has, on the second planar side 128, the first radiator body 110 of the first patch antenna 102.

Figure 2:
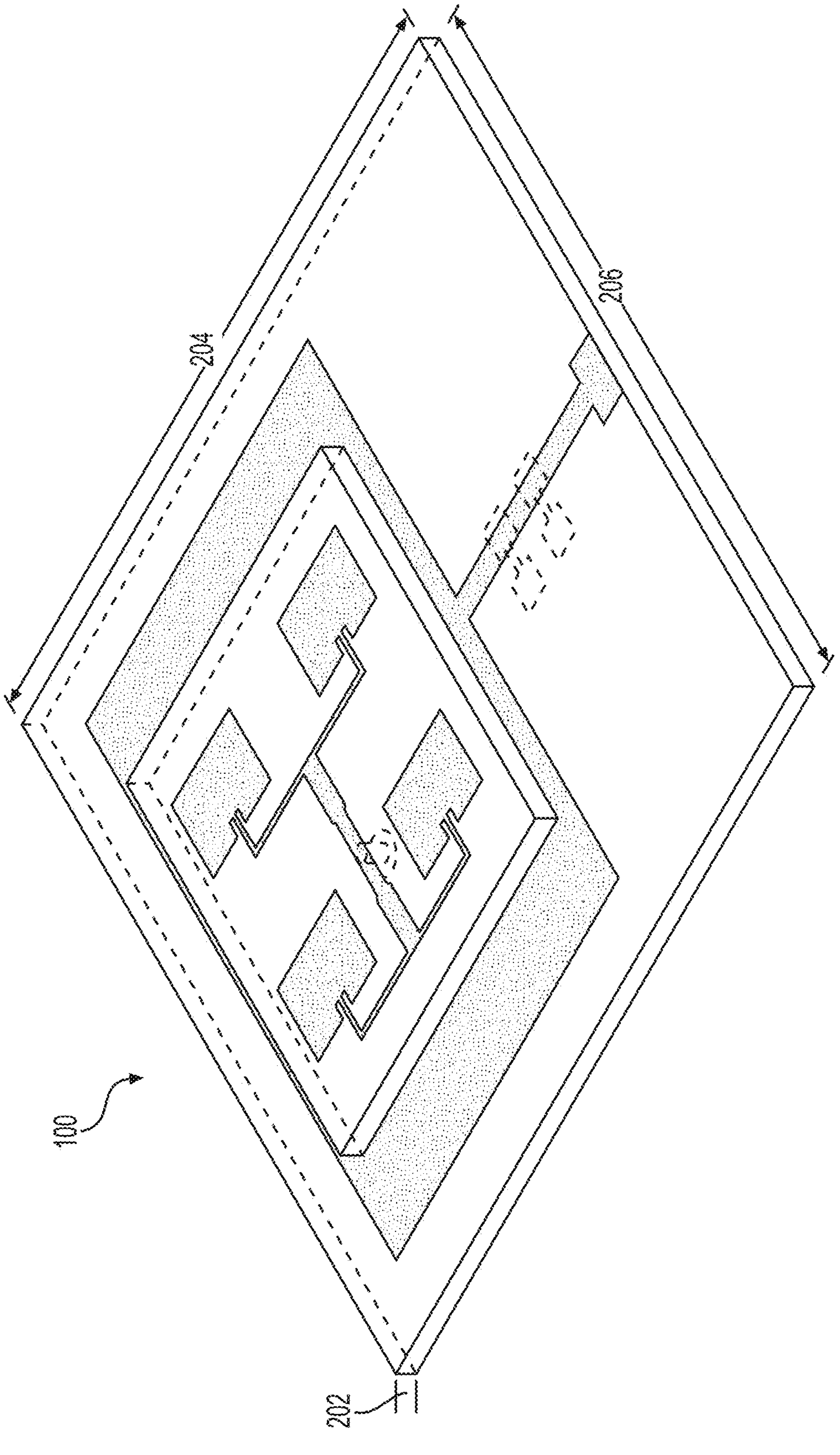

FIG. 2 shows a diagram of an assembly view of the low-profile stacked patch multi-frequency antenna 100 of FIG. 1 in accordance with an illustrative embodiment. Remarkably, the low-profile stacked patch multi-frequency antenna 100 has thickness 202 of about 1.58 mm and an overall planar region of about 28.87 mm (along a first axis 204) by about 27.32 mm (along a second axis 206), which can be expressed as 2.7 $\lambda_H$×2.6 $\lambda_H$×0.15 $\lambda_H$ where $\lambda_H$ is the air wavelength of the high frequency band. Indeed, the thickness 202 of the stacked patch multi-frequency antenna 100 is less than about 6% of the other dimensions of the antenna 100. Other dimensions and ratios can be suitable used for a given application. For the interest of being considered low-profile, the thickness in some embodiments would be less than 1/10 of the dimension of the other dimensions.

To allow for the un-interfered operation, the patch antenna and the patch array elements are stacked vertically to one another (e.g., for DSRC and 5G operations) so as to be orthogonal to one another. For example, the feedline of the patch antenna is introduced to the patch antenna along a first axis, and the feedlines of the patch array elements are introduced to the patch array elements along a second axis. Further, the feedlines of the patch antenna and of the array patch antenna also do not overlap so as to avoid, or minimize, coupling between them.

Referring to FIG. 1, the feedline 112 of the patch antenna 102 are introduced to the first radiator body 110 along a first axis 130. The feedlines of the array patch antenna 104 comprises, in part, the microstrip feedlines 126*a*-126*d*. The microstrip feedlines 126*a* and 126*c* are introduced to the distinct radiator body elements 124*a* and 124*c* along a second axis 132, and the microstrip feedlines 126*b* and 126*d* are introduced to the distinct radiator body elements 124*b* and 124*d* along another second axis 133. The first axis 130 and the second axis 132, 133 are substantially on the same plane and are perpendicular (i.e., orthogonal) to one another. The feedlines of the patch array elements also includes a vertical feedline component (not shown) that is routed through the first dielectric substrate 106 (shown as via 134), the first radiator body 110 (shown as via 136), the reflector ground plane 116, and the second dielectric substrate 118 (shown as via 138) from a coaxial cable 140. The vertical feedline component is defined by an axis 140 that is on a vertical plane that is orthogonal to a horizontal plane associated with axis 112 of the feedline 112 of the patch antenna 102. To further decouple the patch antenna 102 and the array path antenna 104, the patch antenna 102 is configured with a defected ground structure (DGS) 142. Defected ground structures may be implemented as slots or defects integrated on a ground plane of microwave planar circuits. As shown in FIG. 1, the defected ground structure 142 includes a first slot 144 and a second slot 146 in the reflector ground plane 116 that are placed underneath the microstrip feedline 112 (e.g., to achieve band-stop characteristics and to suppress higher mode harmonics and mutual coupling).

Similar approaches can be performed to implement a multi-frequency band antenna system having three or more antenna sets. In some embodiments, two or more patch antennas can be coupled together in which the patch antennas and corresponding feedlines are orthogonal to one another. An array patch antenna can be coupled on top of one of the patch antennas and is configured to have features and feedlines that are orthogonal to the two or more patch antennas.

In some embodiments, another patch element, as a layer, is stacked on top of an array patch antenna, e.g., to increase bandwidth or to provide other additional operating frequency bands.

In another aspect, the exemplary low-profile stacked patch multi-frequency antenna can be configured for beamforming operation. In some embodiments, the array patch antenna 104 is coupled with a plurality of phase-shifter elements, which allows for the control of phase delay between, or among, adjacent array patch elements. In some embodiments, the phase-shifter elements are coupled to respective feedlines of the patch array elements.

Feedline Configuration for Low-Profile Multi-Frequency Patch Antenna

FIG. 3, FIG. 4, FIG. 5, FIG. 6A, FIG. 6B, FIG. 7A, FIG. 7B, FIG. 8, and FIG. 9 each respectively shows example feedline for the patch antenna 102 in accordance with an illustrative embodiment.

Figure 3:
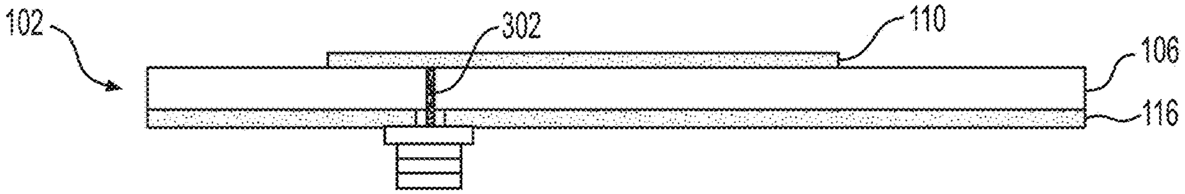

FIG. 3 shows an example probe feedline 302 for the patch antenna 102 in accordance with an illustrative embodiment. The probe feedline 302 is a conductor that carries the signal to, and/or from, the antenna and directly or indirectly connects to the first radiator body 110 through the first dielectric substrate 106 and reflector ground plane 116. In some embodiments, the probe feedline 302 indirectly connects through the first dielectric substrate 106 and reflector ground plane 116 via one or more microstrip lines (not shown—see FIGS. 1 and 2) that connects to the first radiator body 110. In other embodiments, the probe feedline 302 directly connects to an underside of the first radiator body 110 through the first dielectric substrate 106 and reflector ground plane 116.

Figure 4:
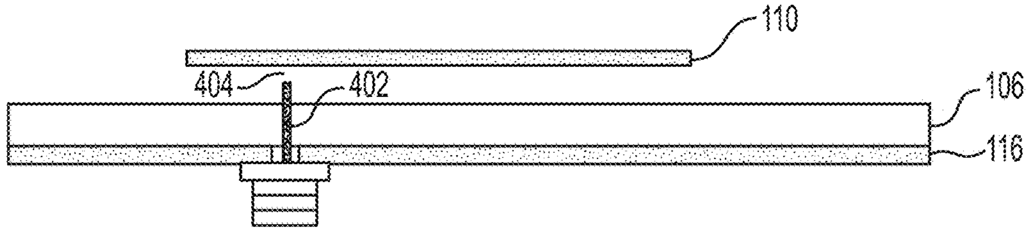

FIG. 4 shows another example probe feedline 402 with a set of one or more gaps 404 in accordance with an illustrative embodiment. The gap 404, or a set thereof, can be configured to serve as a capacitor circuit in series with the probe feedline 402 and the first radiator body 110. In some embodiments, the probe feedline 402 is routed through the first dielectric substrate 106 and reflector ground plane 116 to couple (via or across the gap 404) with a microstrip line that connects to the first radiator body 110. In other embodiments, the probe feedline 402 is routed through the first dielectric substrate 106 and reflector ground plane 116 to couple (via or across the gap 404) to an underside of the first radiator body 110.

Figure 5:
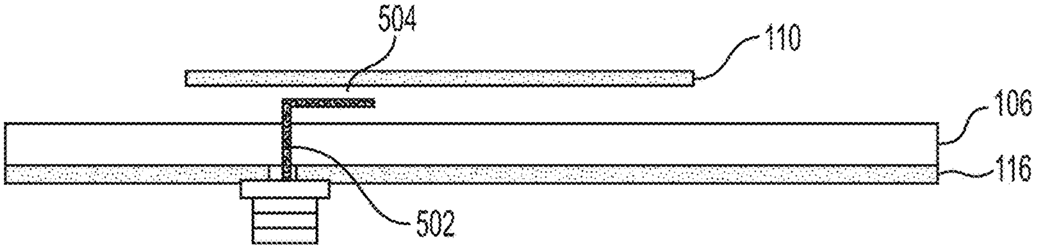

FIG. 5 shows an example L-shape probe feedline 502 for the patch antenna 102 in accordance with an illustrative embodiment. The L-shape probe feedline 502 can be configured to serve as a large capacitor circuit (as compared to the feedline of FIG. 4) in series with the L-shape probe feedline 502 and the first radiator body 110. In some embodiments, the L-shape probe feedline 502 is routed through the first dielectric substrate 106 and reflector ground plane 116 to couple (via or across the gap 504) with a microstrip line that connects to the first radiator body 110. In other embodiments, the L-shape probe feedline 502 is routed through the first dielectric substrate 106 and reflector ground plane 116 to couple (via or across the gap 504) to an underside of the first radiator body 110. Other shaped feedline can be used (e.g., T-shape, etc.)

FIGS. 6A and 6B, collectively, show an example proximity-coupled feedline 602 in accordance with an illustrative embodiment. As shown in each of FIG. 6A (side view) and FIG. 6B (perspective view), the proximity-coupled feedline feed line 602 is placed between two dielectric substrates 604, 606. The radiating patch (e.g., first radiator body 110) is located on a top surface of an upper dielectric substrate 604 and overlaps with the proximity coupled feedline 602.

FIGS. 7A and 7B, collectively, show an example aperture coupled feedline 702 in accordance with an illustrative embodiment. As shown in each of FIG. 7A (side view) and FIG. 7B (perspective view), the radiating patch (e.g., first radiator body 110) and the microstrip feed line 702 are separated by a ground plane 704 embedded between two dielectric substrates 706, 708. Coupling between the patch antennae (e.g., the first radiator body 110) and the feed line 702 is made through a slot or an aperture (710).

FIG. 8 shows examples of microstrip edge feedline 802 in accordance with an illustrative embodiment. As shown in FIG. 8, from a side view (804), the microstrip edge feedline 802 is on the same layer as the radiating patch (e.g., first radiator body 110). Three additional views (806, 808, and 810) are shown for an embodiment of microstrip edge line 802 (in view 806), an embodiment of a microstrip edge line 802 with a quarter-wave transformer structure 812 formed from the edge line (in view 808), and an embodiment of a microstrip edge line 802 with an inset 814 (in view 810).

FIG. 9 shows examples of microstrip edge feedlines 902 with a gap 904 in accordance with an illustrative embodiment. As shown in FIG. 9, from a side view (906), the microstrip edge feedlines 902 is on the same layer as the radiating patch (e.g., first radiator body 110). Then on a corresponding top view (908), the microstrip edge line 902 is shown coupled to the radiating patch (e.g., first radiator body 110) via the gap 904.

FIG. 10, FIG. 11, FIG. 12, and FIG. 13 each respectively shows example feed line for the array patch antenna 104 in accordance with an illustrative embodiment.

FIG. 10 shows an example probe feedline 1002 (shown as 1002*a* and 1002*b*) for an array patch antenna (e.g., 104) in accordance with an illustrative embodiment. Each probe feedline 1002*a*, 1002*b* connects to a respective radiator body elements (shown as 124*a* and 124*b*) of the array patch antenna 104 directly, or via a microstrip line, through the reflector ground plane 116 and any intermediate structures 1004 therebetween. In some embodiments, the intermediate structures 1004 include the first dielectric substrate 106, the first radiator body 110, and second dielectric substrate as, for example, described in relation to FIG. 1.

FIG. 11 shows example probe feedlines 1102 (shown as 1102*a* and 1102*b*) with gaps 1104 (shown as 1104*a* and 1104*b*) in accordance with an illustrative embodiment. In some embodiments, the probe feedlines 1102*a*, 1102*b* are routed through the reflector ground plane 116 and any intermediary layers 1004 (with the array patch antenna 104) to couple (via or across the gap 404) with microstrip lines that connect to the radiator body elements (shown as 124*a* and 124*b*) of the array patch antenna 104. In other embodiments, the probe feedlines 1102*a*, 1102*b* are routed through the reflector ground plane 116 and any intermediary layers 1004 to couple (via or across the gaps 1104*a*, 1104*b*) to an underside of each respective radiator body elements (shown as 124*a* and 124*b*) of the array patch antenna 104.

FIG. 12 shows example L-shape probe feedlines 1202 (shown as 1202*a* and 1202*b*) for the array patch antenna 104 in accordance with an illustrative embodiment. Each of the L-shape probe feedlines 1202*a*, 1202*b* is routed through the reflector ground plane 116 and any intermediary layers 1004 (with the array patch antenna 104) to couple (via or across the gap 1204*a*, 1204*b*) with a respective microstrip line that connects to the radiator body elements (shown as 124*a* and 124*b*) of the array patch antenna 104. In other embodiments, each of the L-shape probe feedlines 1202*a*, 1202*b* is routed through the reflector ground plane 116 and any intermediary layers 1004 (with the array patch antenna 104) to couple (via or across the gaps 1204*a*, 1204*b*) to an underside of each respective radiator body elements (shown as 124*a* and 124*b*) of the array patch antenna 104. Other shaped feedline can be used (e.g., T-shape, etc.)

FIG. 13 shows example feeding comprising proximity-coupled feeds and aperture-coupled feeds for the array patch antenna 104 configured in a corporate feeding network in accordance with an illustrative embodiment.

In an embodiment, to apply the proximity-coupled feed to the corporate feed 1302, the array patch antenna is formed on a top layer of a two-layer substrate 1304 (e.g., as described in relation to FIGS. 6A and 6B), the corporate feed is positioned at a middle layer (not shown) between the two substrates, and the patch antenna 110 is positioned on the bottom layer, such that the corporate feed 1302 is not directly coupled with the array patch antenna 104.

In another embodiment, to apply the aperture-coupled feeds to the corporate feed, a three-layer substrate is used (e.g., as described in relation to FIGS. 7A and 7B). In some embodiments, the array patch antenna 104 is positioned on a top layer (e.g., a first layer), a conductive ground plane with slots is located on a first middle layer (e.g., a second layer), a corporate feed is positioned on a second middle layer (e.g., a third layer), and the patch antenna 110 is positioned on the bottom layer. The corporate feed 1302 is not directly coupled with the array patch antenna 104.

The various feedline embodiments as discussed in relation to FIGS. 3-13 can be individually and in combination for a low-profile stacked patch dual-frequency antenna or for a low-profile stacked patch multi-frequency antenna.

As shown in FIGS. 3-13, the probe feedline may be shown configured as part of an external coaxial cable. Other types of external electrical connections or cables can be used. In some embodiments, shielded twisted pair cables and/or unshielded twisted pair cables are used. In other embodiments, lead frames and/or wire bonds interconnect and/or other die attaching techniques are used.

Example Low-Profile Stacked Patch Dual-Frequency Antenna

FIG. 14A and FIG. 14B show an example design of a low-profile stacked patch dual-frequency antenna (e.g., 1402*a* and 1402*b*) in accordance with an illustrative embodiment. FIG. 14B lists dimensions for various features of the design of an embodiment of the patch antenna 102 and the array patch antenna 104. FIG. 14A shows corresponding features of the dimensions shows in FIG. 14B. FIG. 14C shows a fabricated low-profile stacked patch dual-frequency antenna 1402*a* in accordance with an illustrative embodiment. FIG. 14D shows another fabricated low-profile stacked patch dual-frequency antenna 1402*b* in accordance with an illustrative embodiment. In FIG. 14C, the low-profile stacked patch dual-frequency antenna 1402*a* is fabricated with a standard SMA co-axial cable. In FIG. 14D, the low-profile stacked patch dual-frequency antenna 1402*b* is fabricated with a 2.4 mm connector.

As shown in FIGS. 14A and 14B, the array patch antenna 104 consists of a 2-by-2 inset-fed patch array antenna with a power divider (Layer I) that is formed on top of Rogers RT/duroid 5880 (Layer II: $\varepsilon_r$=2.2 and tan $\delta_\varepsilon$=0.0009). Each of the patch antenna elements of the array patch antenna includes a quarter-wave transmission line (Layer III) that is also formed and placed on top of the Rogers RT/duroid 5880 substrate (Layer IV). The ground plane includes two dumb-bell-shaped DGS (Layer V) and is placed on the bottom of Layer IV. The inset-fed patch array is fed by the probe (Port I), and the power divider and the patch antenna are fed by a coaxial connector and the quarter-wave transmission line (Port II) configured to match the impedance of the patch antenna.

Experimental and Simulation Results

Dual-frequency and high isolation "|S21|" and gain can be achieved by the example design of a low-profile stacked patch dual-frequency antenna 1402 (e.g., 1402*a* or 1402*b*).

FIG. 15 shows simulated frequency dependent S-parameters characteristics of the low-profile dual-frequency patch antenna 1402*a* of FIG. 14C in accordance with an illustrative embodiment. The simulated frequency dependent S-parameters includes a reflection coefficient at Port1 "|S11|", a reflection coefficient at Port2 "|S22|", and an isolation value between the antenna "|S21|".

Experimental results of |S11|, |S21|, and |S22| are shown of the low-profile dual-frequency patch antenna 1402*a*, 1402*b* of FIGS. 14C and 14D configured with defected ground structures (shown as 1502, 1504, and 1506, respectively) and of the same low-profile dual-frequency patch antenna 1402*a* and 1402*b* without a defected ground structure (shown as 1508, 1510, and 1512, respectively). Performance of the two antennas was simulated by the ANSYS high frequency structure simulator (HFSS v.18.1).

As shown in FIG. 15, with the inclusion of the defected ground structures (see lines 1504 and 1510), the simulated isolation "|S21|" between the two ports at 28 GHz (corresponding to the "5G" frequency band 1514) is increased from about −25 dB (shown at arrow 1516) to about −41 dB (shown at arrow 1518).

In addition, with the inclusion of the defected ground structures (see lines 1506 and 1512), FIG. 15 shows a significantly increase (shown as arrows 1520 and 1522) in the reflection coefficient "|S22|" for the Port II (associated with the patch antenna configured to operate at the DSRC frequency band 1524). Indeed, efficiency and channel capacity of the MIMO system can be improved with such isolation performance and reflection coefficient. FIG. 15 further shows that the low-profile dual-frequency patch antenna 1402 (e.g., 1402*a* and 1402*b*) configured with the defected ground structures resonates at the 28-GHz frequency (with Port I) (shown at arrow 1518) and at the 5.9-GHz frequency (with Port II) (shown at arrow 1522). The 10-dB impedance bandwidths is shown as about 1.86 percent (between 5.835 GHz and 5.945 GHz) for the low frequency band and about 4.1 percent (between about 27.45 GHz and 28.6 GHz) for the high frequency band. This set of frequency characteristics would be suitable for DSRC communications (which operate between 5.85 GHz and 5.925 GHz) and for 5G communications (which operates between about 27.5 GHz and 28.5 GHz).

FIGS. 16A and 16B each shows measured frequency dependent S-parameters characteristics of the low-profile dual-frequency patch antenna 1402 (e.g., 1402*a*, 1402*b*) of FIGS. 14C and 14D, respectively, in accordance with an illustrative embodiment.

FIGS. 17A and 17B each shows simulated and measured frequency dependent realized gain at boresight (in dBi) of the low-profile dual-frequency patch antenna 1402 (e.g., 1402*a*, 1402*b*) of FIGS. 14C and 14D, respectively, in accordance with an illustrative embodiment. As shown in FIGS. 17A and 17B, the low-profile dual-frequency patch antenna 1402*a* and 1402*b* of FIGS. 14C and 14D achieves a high radiation efficiency above 90% at both the low and the high frequency bands. The realized boresight gain at the DSRC band (between about 5.85 GHz and about 5.925 GHZ) is about 7 dBi to about 7.3 dBi and at the 5G band (between about 27.5 GHz and about 28.5 GHz) is about 11 dBi to about 13.6 dBi, as shown in FIG. 17A. Similar results are shown in FIG. 17B. FIG. 17B also shows the efficiency profile at the low frequency (1702) and at the high frequency (1704). It is noted that the realized gain at boresight is maintained at a level higher than 12.5 dBi up to about 30 GHz in both FIGS. 17A and 17B. Indeed, the low-profile dual-frequency patch antenna 1402 (e.g., 1402*a*, 1402*b*) of FIGS. 14C and 14D and corresponding design of FIGS. 14A and 14B are suitable for applications of at least up to 30 GHz and can be used for even higher frequency applications.

FIGS. 18A and 19A show simulated and measured normalized E-plane and H-plane radiation patterns of the low-profile dual-frequency antenna of FIG. 14C at about 5.9 GHz in accordance with an illustrative embodiment. FIGS. 18B and 19B show simulated and measured normalized E-plane and H-plane radiation patterns of the low-profile dual-frequency antenna of FIG. 14D at about 5.9 GHz in accordance with an illustrative embodiment. FIGS. 20A and 21A show simulated normalized E-plane and H-plane radiation patterns of the low-profile dual-frequency antenna of FIG. 14C at about 28 GHz in accordance with an illustrative embodiment. FIGS. 20B and 21B show both simulated and measured normalized E-plane and H-plane radiation patterns of the low-profile dual-frequency antenna of FIG. 14D at about 28 GHz in accordance with an illustrative embodiment.

At both frequency bands, FIGS. 18A-21A and FIGS. 18B-21B show that broadside radiation patterns with small back-lobes (>−20 dB) are achieved that illustrate that the low-profile dual-frequency antenna has directional radiation characteristics. Further, as shown in FIGS. 18A-21A and FIGS. 18B-21B, the co-polarized radiations are substantially higher than the cross-polarized radiations by −40 dB in the boresight at about 5.9 GHz (DSRC) and by −30 dB in the boresight at about 28 GHz. Furthermore, the half-power beam widths in the E-plane is 74° at about 5.9 GHz and in the H-plane is 80° at 5.9 GHz, and the half-power beam widths in the E-plane is 30° at about 28 GHz and in the H-plane is 41° at 28 GHz.

FIGS. 22 and 23 show simulated electric field distribution characteristics of the low-profile dual-frequency antenna of FIG. 14 in accordance with an illustrative embodiment. FIG. 22 shows field distribution characteristics at about 5.9 GHz, and FIG. 23 shows field distribution characteristics at about 28 GHz. In FIG. 22, indeed, it is observed that the dominant $TM_{01}$ mode is observed radiating from the bottom patch radiator. In FIG. 23, indeed, it is observed that the dominant $TM_{01}$ mode is observed radiating from the top patch array radiator.

FIG. 24 is a table showing comparative characteristics and performance of the low-profile dual-frequency antenna of FIG. 14 with other reported dual-frequency antennas in the technical literature in accordance with an illustrative embodiment. The dual-frequency antennas as described in P. Li, K. M. Luk, and K. L. Lau, "A dual-feed dual-band L-probe patch antenna," IEEE Trans. Antennas Propag., vol. 53, p. 2321 (2005); L. Y. Feng and K. W. Leung, "Dual-frequency folded-parallel-plate antenna with large frequency ratio," IEEE Transactions on Antennas and Propagation, vol. 64, no. 1, pp. 340-345, (2016); and Y.-X. Sun and K. W. Leung, "Substrate-Integrated Two-Port Dual-Frequency Antenna," IEEE Transactions on Antennas and Propagation, vol. 64, no. 8, pp. 3692-3697 (2016), are included in the comparison. Each of these references are incorporated by reference herein in its entirety.

As shown in FIG. 24, the low-profile dual-frequency antenna of FIG. 14 has a smaller form factor as compared to other reported dual-frequency antennas in the technical literature. Further, the low-profile dual-frequency antenna of FIG. 14 has a higher isolation characteristics as compared to certain designs (e.g., greater than 35 dB) and a high peak gains of about 7.3 dBi and about 13.6 dBi at the low and high frequency bands, respectively. Further, the low-profile dual-frequency antenna of FIG. 14 is the first antenna design that covers 5G and DSRC communications.

FIG. 25 is a diagram of example telematics applications for safety, navigation, communication, entertainment, toll and parking, autonomous operation, among others.

Having thus described several embodiments of the claimed invention, it will be rather apparent to those skilled in the art that the foregoing detailed disclosure is intended to be presented by way of example only, and is not limiting. Many advantages for non-invasive method and system for location of an abnormality in a heart have been discussed herein. Various alterations, improvements, and modifications will occur and are intended to those skilled in the art, though not expressly stated herein. Any alterations, improvements, and modifications are intended to be suggested hereby, and are within the spirit and the scope of the claimed invention. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:

1. An apparatus comprising:

one or more patch antennas, including a first patch antenna comprising a first dielectric substrate having, on a first planar side, a first radiator body in connection with a first set of feedlines and, on a second planar side, a reflector ground plane; and a patch array antenna coupled to the first patch antenna to form a stacked structure, wherein the patch array antenna comprises a second dielectric substrate having, on a first planar side, a second radiator body comprising a plurality of distinct radiator body elements in connection with a second set of feedlines and, on the second planar side, the first patch antenna, wherein the plurality of distinct radiator body elements of the patch array antenna are oriented in same orientation and entirely overlap with the first radiator body, and wherein the first set of feedlines of the first radiator body of the first patch antenna is oriented substantially orthogonal to the second set of feedlines of the second radiator body of the patch array antenna.

2. The apparatus of claim 1, wherein the second radiator body comprises the distinct radiator body elements to form a power divider.

3. The apparatus of claim 1, wherein the second radiator body of the patch array antenna comprises a quarter-wave transmission line.

4. The apparatus of claim 3, wherein the first patch antenna comprises a defected ground structure.

5. The apparatus of claim 1, wherein the first patch antenna is configured to operate at a first frequency band and the patch array antenna is configured to operate at a second frequency band, wherein a substantial portion of the second frequency band is higher in frequency than a substantial portion of the first frequency band.

6. The apparatus of claim 5, wherein the first frequency band is selected from the group consisting of Wireless LAN antenna frequency band, Multi-application antenna frequency band, PCS phone frequency band, cellular phone antenna frequency band, and toll and parking related on-board unit frequency band, and wherein the second frequency band is selected from the group consisting of 5G wireless frequency band and 60 GHz frequency band.

7. The apparatus of claim 1, wherein each of the patch array antenna and the one or more patch antennas are configured to operate at a set of frequency bands distinct from one another.

8. The apparatus of claim 1, wherein the plurality of distinct radiator body elements of the patch array antenna has a number of antenna elements selected from group consisting of one, two, three, four, five, six, seven, and eight.

9. The apparatus of claim 1, wherein the plurality of distinct radiator body elements of the patch array antenna has a number of antenna elements greater than eight.

10. The apparatus of claim 1, wherein at least one of the plurality of distinct radiator body elements of the patch array antenna has an overall shape selected from the group consisting of a circle, a triangle, a square, an oval, and a rectangle.

11. The apparatus of claim 1, wherein the first patch antenna has an overall shape selected from the group consisting of a circle, a triangle, a square, an oval, and a rectangle.

12. The apparatus of claim 1, wherein the first patch antenna comprises one or more phase-shifting elements coupled to feedlines of each of the plurality of distinct radiator body elements.

13. The apparatus of claim 1, wherein the first set of feedlines of the first patch antenna is configured as a probe feed, an inset-feed, a proximity coupled-feed, or an aperture coupled-feed.

14. The apparatus of claim 1, wherein the second set of feedlines of patch array antenna is configured as a probe feed with corporate feeding network, an inset-feed, a proximity coupled-feed with corporate feeding network, or an aperture coupled-feed with corporate feeding network.

15. The apparatus of claim 1, further comprising:

a housing; and a mixed-signal die placed in the housing, the mix-signal die being coupled to a portion of the first set of feedlines or to a portion of second set of feedlines.

16. A system comprising:

a microelectronic package; and a stacked patch antenna disposed within the microelectronic package, wherein the stacked patch antenna disposed comprises:

one or more patch antennas, including a first patch antenna comprising a first dielectric substrate having, on a first planar side, a first radiator body in connection with a first set of feedlines and, on a second planar side, a reflector ground plane; and a patch array antenna coupled to the first patch antenna to form a stacked structure, wherein the patch array antenna comprises a second dielectric substrate having, on a first planar side, a second radiator body comprising a plurality of distinct radiator body elements in connection with a second set of feedlines and, on the second planar side, the first patch antenna, wherein the plurality of distinct radiator body elements of the patch array antenna are oriented in same orientation and entirely overlap with the first radiator body, and wherein the first set of feedlines of the first radiator body of the first patch antenna is oriented substantially orthogonal to the second set of feedlines of the second radiator body of the patch array antenna.

17. The system of claim 16, further comprising:

a mixed-signal die placed in the microelectronic package, the mix-signal die being coupled to a portion of the first set of feedlines or to a portion of second set of feedlines.

18. A method of operating a stacked patch antenna, the method comprising:

directing a first set of electrical signal associated with a first set of frequency bands to, and from, a first patch antenna comprising a first dielectric substrate having, on a first planar side, a first radiator body in connection with a first set of feedlines and, on a second planar side, a reflector ground plane; and directing a second set of electrical signal associated with a second set of frequency bands to, and from, a patch array antenna coupled to the first patch antenna, wherein the patch array antenna is coupled to the first patch antenna to form a stacked structure, and wherein the patch array antenna comprises a second dielectric substrate having, on a first planar side, a second radiator body comprising a plurality of distinct radiator body elements in connection with a second set of feedlines and, on the second planar side, the first patch antenna, wherein the plurality of distinct radiator body elements of the patch array antenna are oriented in same orientation and entirely overlap with the first radiator body, and wherein the first set of feedlines of the first radiator body of the first patch antenna is oriented substantially orthogonal to the second set of feedlines of the second radiator body of the patch array antenna.

* * * * *